(12) United States Patent
Ichimiya

(10) Patent No.: US 8,369,699 B2
(45) Date of Patent: Feb. 5, 2013

(54) FOCUS DETECTION APPARATUS

(75) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/090,781

(22) Filed: Apr. 20, 2011

(65) Prior Publication Data

US 2011/0262123 A1 Oct. 27, 2011

(30) Foreign Application Priority Data

Apr. 27, 2010 (JP) .................................. 2010-102686
Jun. 17, 2010 (JP) .................................. 2010-137822

(51) Int. Cl.
*G03B 3/00* (2006.01)

(52) U.S. Cl. ........................................................ 396/104

(58) Field of Classification Search .................... 396/104
See application file for complete search history.

(56) References Cited

U.S. PATENT DOCUMENTS

| | | | | |
|---|---|---|---|---|
| 4,792,821 | A  * | 12/1988 | Akashi ........................... | 396/102 |
| 7,936,986 | B2 * | 5/2011  | Ichimiya ......................... | 396/98  |
| 2008/0192139 | A1 * | 8/2008  | Kanai et al. .................... | 348/360 |
| 2008/0239136 | A1 * | 10/2008 | Kanai et al. .................... | 348/340 |
| 2009/0022486 | A1 * | 1/2009  | Muramatsu .................... | 396/104 |

FOREIGN PATENT DOCUMENTS

| | | |
|---|---|---|
| CN | 101441389 A | 5/2009 |
| CN | 101568870 A | 10/2009 |
| JP | 2009-010672 | 1/2009 |

OTHER PUBLICATIONS

Oct. 10, 2012 Chinese Office Action, a copy of which is enclosed with an English Translation, that issued in Chinese Patent Application No. 201110107271.3.

* cited by examiner

*Primary Examiner* — Rodney Fuller
(74) *Attorney, Agent, or Firm* — Cowan, Liebowitz & Latman, P.C.

(57) ABSTRACT

A focus detection apparatus includes an image pickup element 106 that takes an object image, an object recognition circuit 109 that compares an obtained image with a previously stored image to detect a position of a main object, an AF sensor 101 that detects an in-focus state of a plurality of positions, a reliability determination circuit 110 that determines a reliability of a detection result of the in-focus state, a determination part 100 that determines a position where the reliability of the detection result of the in-focus state is the highest based on a determination result of the reliability determination circuit, and a selector 114 that selects one of the detection results of the in-focus state of the position of the main object and of the in-focus state of the position where the reliability of the detection result of the in-focus state is highest to focus the photographic optical system.

7 Claims, 20 Drawing Sheets

| ITEMS | RESULTS | | EVALUATION VALUES |
|---|---|---|---|
| CONTRAST | 10000~ | A | 2 |
| | 1000~9999 | | 1 |
| | ~999 | | 0 |
| BRIGHTNESS | THERE IS NO BRIGHT POINT | B | 1 |
| | THERE IS BRIGHT POINT | | 0 |
| COLOR | THERE IS NO COLOR CONTRAST | C | 1 |
| | THERE IS COLOR CONTRAST | | 0 |
| DIRECTION OF CONTRAST | $60° < \theta \leq 90°$ | D | 2 |
| | $45° < \theta \leq 60°$ | | 1 |
| | $0° \leq \theta \leq 45°$ | | 0 |

\* SUPPLEMENTARY ANGLE IS USED WHEN $\theta$ IS BEYOND 90 DEGREES

FIG. 12

FOCUS DETECTION APPARATUS

BACKGROUND OF THE INVENTION

1. Field of the Invention

The present invention relates to a focus detection technology in an image pickup apparatus such as a digital camera.

2. Description of the Related Art

A phase detection method is generally well known as a conventional autofocus detection apparatus of a camera. In the phase detection method, lights transmitted through different exit pupil areas of a photographic optical system from an object are imaged on a pair of AF (autofocus) sensors to calculate a relative position of a pair of object images obtained by performing the photoelectric conversion (hereinafter, referred to as a phase difference calculation). Thus, a defocus amount of the photographic optical system can be detected.

The following object tracking autofocus detection apparatus is also known. In other words, a multi-divisional image sensor is used in addition to the AF sensor described above, and an object image that is a tracking object in a shooting image is stored as a reference image. Then, images repeatedly taken are compared with the reference image to detect an object position and further focus detection is performed for the detected object position.

For example, Japanese Patent Laid-Open No. 2009-010672 discloses an apparatus that automatically tracks a moving object to perform focus detection or focusing. FIG. 25 is a block diagram illustrating a focus detection apparatus that is disclosed in Japanese Patent Laid-Open No. 2009-010672. A position of the moving object is tracked using an image obtained from a second image pickup element 16 different from a focus detection element 10, and a focusing is performed by a signal obtained from the focus detection element 10 that corresponds to the detected object position.

However, in the focus detection apparatus disclosed in Japanese Patent Laid-Open No. 2009-010672, there is a case in which the stored reference image may be an object which is difficult to be detected by the AF. In this case, the problem that continues to take defocused pictures is generated since the object is tracked based on the AF result having low reliability. The following (1) to (4) are examples of the object which is difficult to be detected by the AF.

(1) a case where contrast is low (2) a case where an object luminance is extremely high (a bright point such as a regular reflection light of sunlight)

(3) a case where a color combination of the contrast is not appropriate (such as an edge contrast of blue and red)

(4) a case where an oblique contrast with respect to an AF sensor (line sensor)

When the reference image is (1), the reliability of the phase difference calculation is low because the contrast of the image signal obtained by the AF sensor is low, and therefore the AF can never be performed although the object tracking can be performed. When the reference image is (2), the image signal obtained by the AF sensor is saturated, and an accurate image signal cannot be obtained. When the reference image is (3), the image signal obtained by the AF sensor is distorted and an error is generated in a correlation calculation result because the image signals having different wavelengths are imaged on different focal positions by the influence of a chromatic aberration of the photographic optical system. When the reference image is (4), the center of gravity of the image signal obtained by the AF sensor is shifted and an error is generated in the phase difference calculation result due to a manufacturing adjustment position error of optical axes of the AF sensor and the AF imaging lens.

Generally, since the AF sensor is constituted by a line sensor that cannot detect a color, the object of (3) or (4) cannot be determined based on the image signal obtained by the AF sensor. Therefore, even if the object is an object which is difficult to be detected, a warning cannot be given to a user.

SUMMARY OF THE INVENTION

The present invention provides a focus detection apparatus capable of improving focus detection accuracy in performing focus detection while tracking an object.

A focus detection apparatus as one aspect of the present invention includes an image pickup element configured to take an object image incident via a photographic optical system, an object recognition part configured to compare an image obtained by the image pickup element with an image stored previously to detect a position of a main object based on the image obtained by the image pickup element, a focus detection part configured to detect an in-focus state of a plurality of positions in a screen of the image pickup element, a reliability determination part configured to determine a reliability of a detection result of the in-focus state of the plurality of positions including the position of the main object in the screen of the image pickup element, a determination part configured to determine a position where the reliability of the detection result of the in-focus state is the highest of the plurality of positions based on a determination result of the reliability determination part, and a selector configured to select one of the detection result of the in-focus state of the position of the main object and the detection result of the in-focus state of the position where the reliability of the detection result of the in-focus state is determined to be the highest to focus the photographic optical system.

Further features and aspects of the present invention will become apparent from the following description of exemplary embodiments with reference to the attached drawings.

BRIEF DESCRIPTION OF THE DRAWINGS

FIG. 12 is a correspondence table of reliability calculation results and evaluation values in the first embodiment.

DESCRIPTION OF THE PREFERRED EMBODIMENTS

Exemplary embodiments of the present invention will be described below with reference to the accompanied drawings.

First Embodiment

Figure 1:
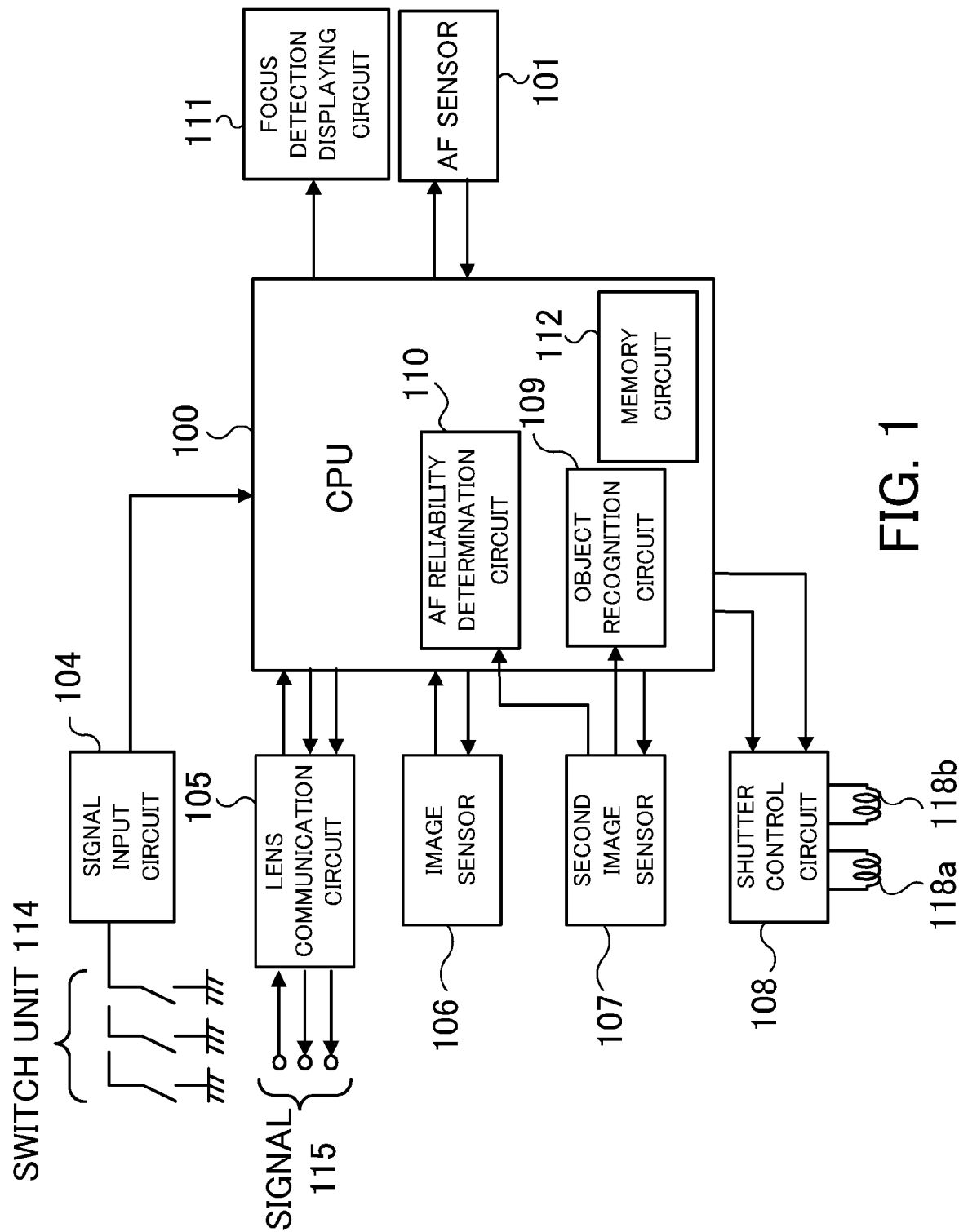
FIG. 1 is a block diagram illustrating a configuration of a camera that is equipped with a focus detection apparatus in the first embodiment.

FIG. 1 is a block diagram illustrating a configuration of a camera (an image pickup apparatus) that is equipped with a focus detection apparatus in an embodiment of the present invention. A camera microcomputer (hereinafter, referred to as a CPU) 100 connects with a signal input circuit 104 for detecting a switch unit 114 (a selector) for various kinds of operations of the camera and an image sensor (an image pickup element) 106. The CPU 100 (a determination part) also connects with a second image sensor 107, a shutter control circuit 108 that controls shutter magnets 118a and 118b, an AF sensor 101 (a focus detection part), and a focus detection point displaying circuit 111. Signals 115 are transmitted between the CPU 100 and a photographic optical system 200 (see FIG. 2) via a lens communication circuit 105 to control a focal position and an aperture.

The operation of the camera is determined by a setting of the switch unit 114. The switch unit 114 includes a switch SW1 that starts an AF operation, a switch SW2 that starts an imaging operation, a select switch (a select SW) that selects a focus detection point, and the like.

The AF (autofocus) sensor 101 includes a plurality of line sensors. The CPU 100 controls the AF sensor 101 to detect a defocus amount based on a contrast distribution of an object obtained by each of the line sensors to control the focal position of the photographic optical system 200.

The second image sensor 107 is a multi-pixel area sensor that takes an object image for the photometry or the object recognition, and is provided with original color filters of R (red), G (green), and B (blue) in a pixel part. Thus, RGB signals of the object image can be outputted. The CPU 100 controls the second image sensor 107 to detect a luminance of the object and determine an aperture value or a shutter speed of the photographic optical system 200. The CPU 100 performs a control of the aperture value via the lens communication circuit 105 and also performs a shutter speed control by controlling a power-carrying time of the magnets 118a and 118b via the shutter control circuit 108, and additionally performs an imaging operation by controlling the image sensor 106. An image obtained by the second image sensor 107 is processed by an object recognition circuit 109 (an object recognition part) in the CPU 100 and obtains luminance distribution information and color information of the object to perform a position detection of a main object that exists in an image based on object information previously stored. Furthermore, the obtained luminance distribution information and the color information are processed by an AF reliability determination circuit 110 (a reliability determination part) to determine an object that is difficult to be detected by the AF sensor 101.

The focus detection point displaying circuit 111 displays a focus detection point that corresponds to a position of the main object detected by the object recognition circuit 109 and a focus detection point that is most suitable for the defocus detection near or at a position of the main object determined by the AF reliability determination circuit 110.

The CPU 100 is embedded with a memory circuit 112 containing a ROM that stores a program for controlling the camera operation, a RAM that stores a variable, an EEPROM (Electronically Erasable and Programmable Read Only Memory) that stores various kinds of parameters, and the like.

Figure 2:
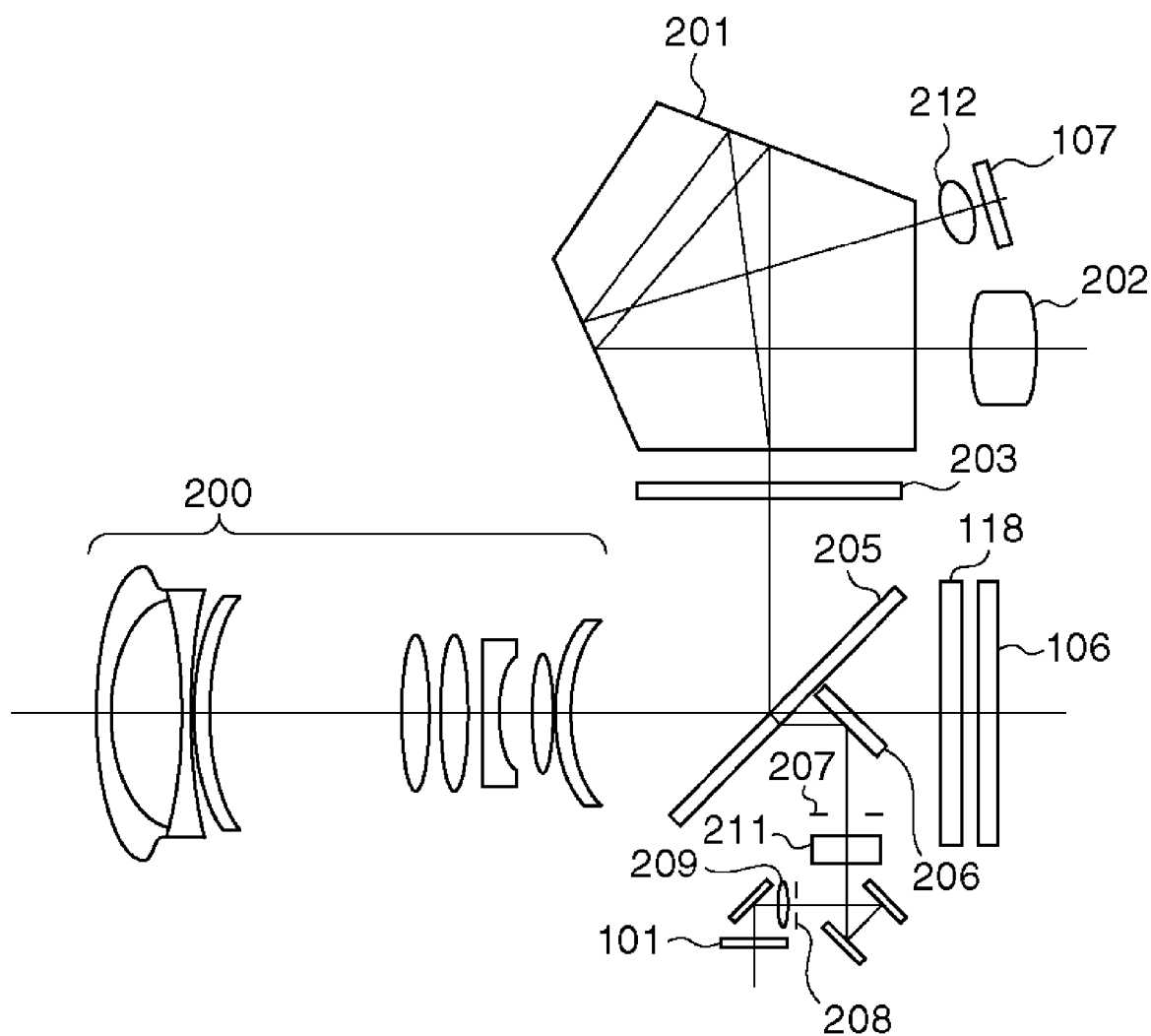
FIG. 2 is a diagram illustrating an optical configuration of a camera in the first embodiment.

FIG. 2 is a diagram illustrating an optical configuration of the camera. A large part of incident light from the object via the photographic optical system 200 is reflected upward by a quick return mirror 205 to form an image on a finder screen 203. The finder screen 203 has a through-type liquid crystal display structure for a focus detection display, which displays a focus detection point by the drive of the focus detection point displaying circuit 111. A user of the camera observes this image via a pentaprism 201 and an eyepiece lens 202 to be able to confirm the focus detection point superimposed on the screen.

The second image sensor 107 takes an image on the finder screen 203 via a second imaging lens 212. The image obtained by the second image sensor 107 is processed to perform object recognition and photometry.

A part of the image light transmits through the quick return mirror 205 and is bent downward by a latter sub-mirror 206 to form an image on the AF sensor 101 via a field of view mask 207, a field lens 211, an aperture 208, and a secondary imaging lens 209. A phase difference calculation is performed for an image signal obtained by a photoelectric conversion of this image to be able to detect an in-focus state of the photographic optical system 200.

In taking an image, the quick return mirror 205 jumps up and a shutter control is performed by carrying currents to the shutter magnets 118a and 118b so that total of the lights is imaged on the imaging sensor 106 to take an object image.

A focus detection method in the present embodiment uses a known phase detection method, which is able to detect in-focus states in a plurality of different areas in a screen.

Figure 3:
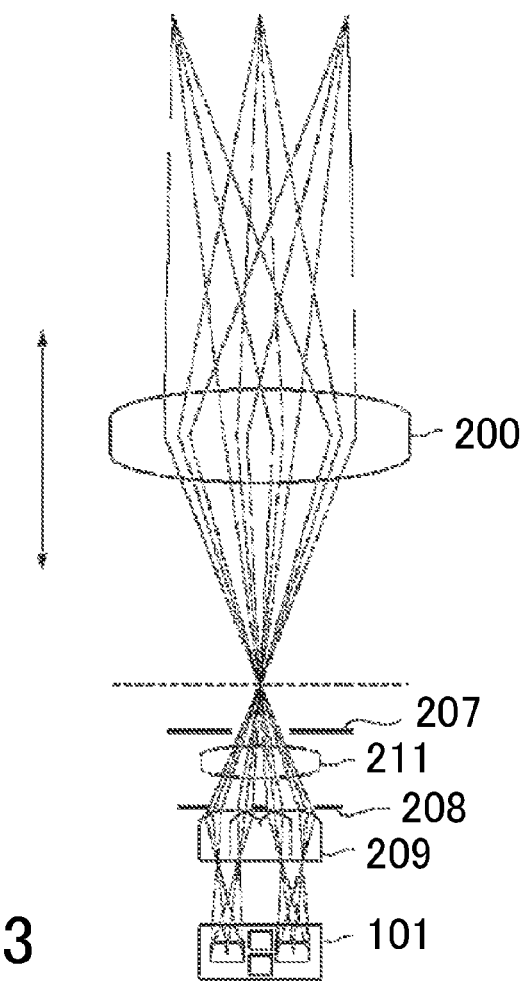
FIG. 3 is a diagram illustrating a detail configuration of an optical system for focus detection by a phase detection method in the first embodiment.

FIG. 3 is a diagram illustrating a detail configuration of an optical system for the focus detection performed by the phase detection method. The light from the object transmitted through the photographic optical system 200 is reflected by the sub-mirror 206 to form an image near the field of view mask 207 that is on a plane conjugate with an imaging plane once. In FIG. 3, a developed optical path that is reflected and returned by the sub-mirror 206 is illustrated. The field of view mask 207 is a member to shield extra light other than a focus detection area (a focus detection point) in the screen. The field lens 211 has a function that forms an image of each opening of the aperture 208 near an exit pupil of the photographic optical system 200. The secondary imaging lens 209 is disposed behind the aperture 208, which is constituted by two pairs of four lenses, and each of the lenses corresponds to each opening of the aperture 208.

Each light transmitted through the field of view mask 207, the field lens 211, the aperture 208, and the secondary imaging lens 209 forms an image on line sensors on the AF sensor 101. The AF sensor 101 is configured so that a light from a different object in a shooting screen can also be imaged.

Figure 4:
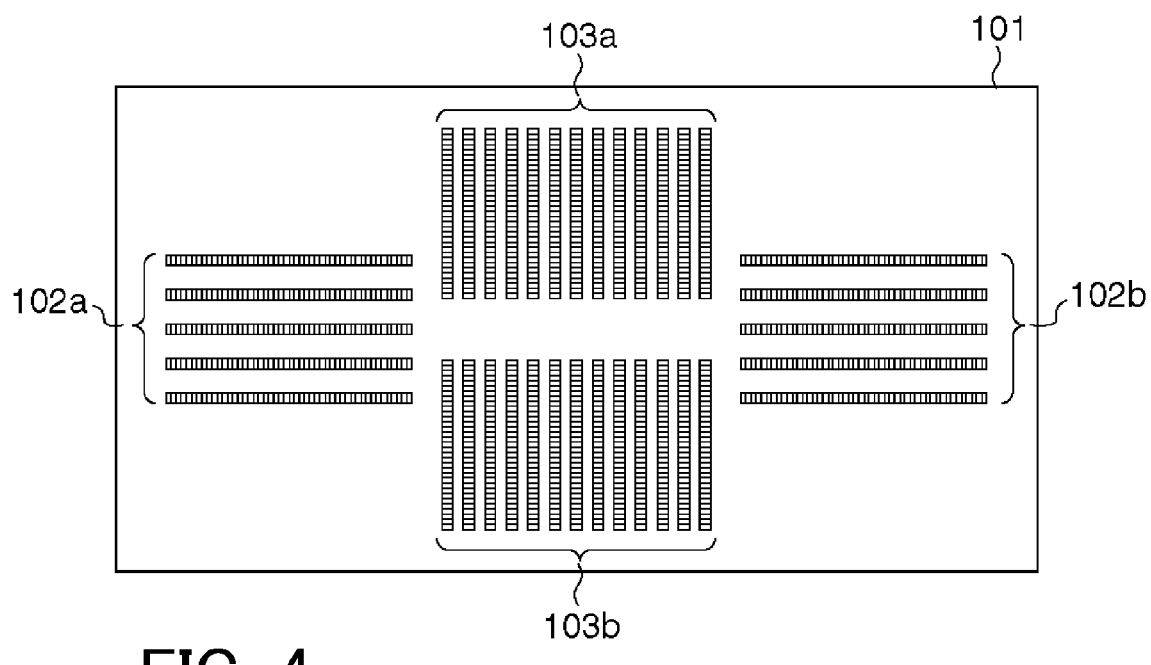
FIG. 4 is an arrangement diagram of line sensors in an AF sensor in the first embodiment.
Figure 5A:
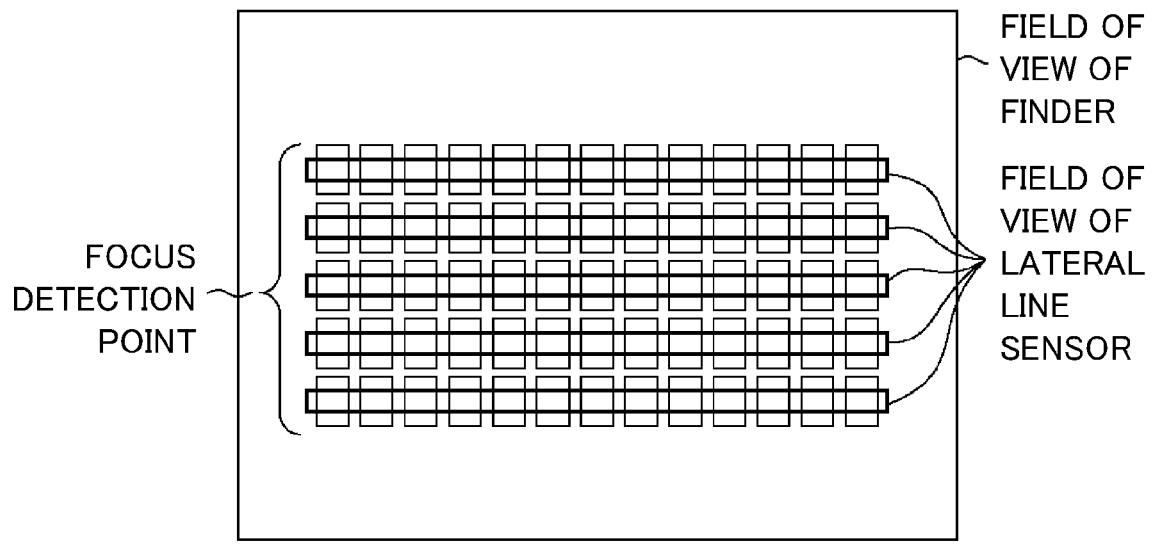
FIGS. 5A and 5B are diagrams illustrating positions of focus detection points and fields of views of line sensors in the first embodiment.
Figure 5B:
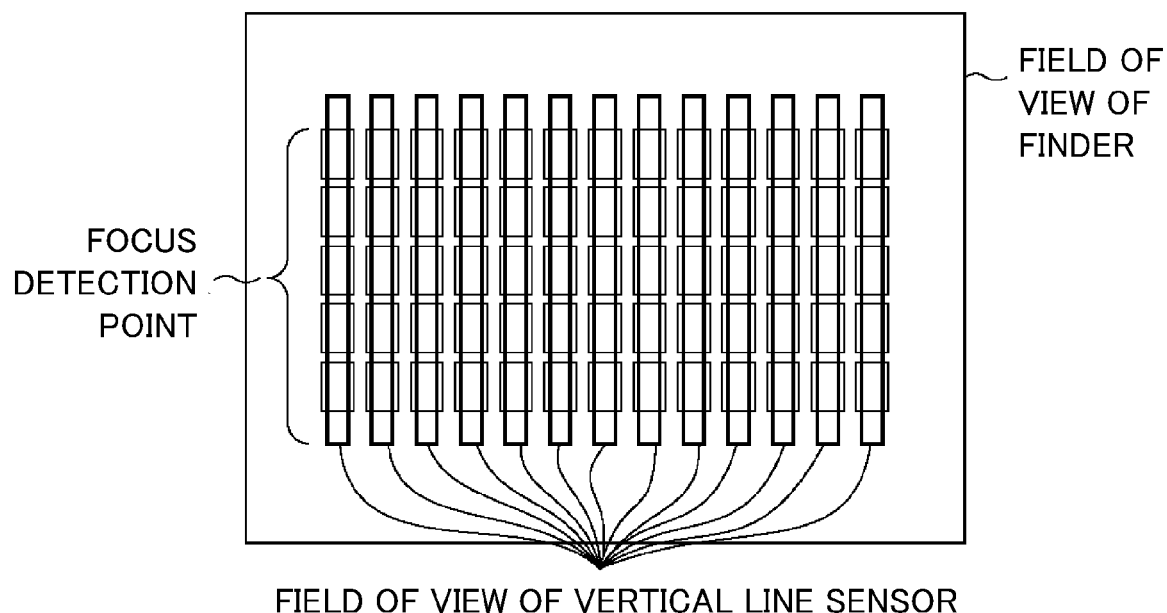

Referring to FIG. 4 and FIGS. 5A and 5B, the line sensors on the AF sensor 101 in the shooting screen will be described. FIG. 4 is an arrangement diagram of the line sensors of the AF sensor 101. A line sensor 102*a* is configured by arraying five lateral line sensors each of which has a plurality of pixels in a lateral direction. A line sensor 102*b* also has similar line sensors. The line sensors 102*a* and 102*b* optically have a paired relationship by the secondary imaging lens 209.

A line sensor 103*a* is configured by arraying thirteen vertical line sensors each of which has a plurality of pixels in a vertical direction. A line sensor 103*b* also has similar line sensors. The line sensors 103*a* and 103*b* optically have a paired relationship by the secondary imaging lens 209.

FIGS. 5A and 5B are diagrams illustrating position relations of focus detection points and fields of views of the line sensors on the finder screen. FIG. 5A illustrates fields of views of the lateral line sensors by the line sensors 102*a* and 102*b*. The line sensors 102*a* and 102*b* receive lights of approximately the same areas of the object by the secondary imaging lens 209. Each of the line sensors 102*a* and 102*b* having five lines is divided into thirteen areas to be able to detect a defocus amount of the focus detection points of total 65 points of 13×5 based on an image signal of each divided area.

FIG. 5B illustrates fields of views of the vertical line sensors by the line sensors 103*a* and 103*b*. The line sensors 103*a* and 103*b* receive lights of approximately the same areas of the object by the secondary imaging lens 209. Each of the line sensors 103*a* and 103*b* having thirteen lines is divided into five areas to be able to detect a defocus amount of the focus detection points of total 65 points of 13×5 based on an image signal of each divided area.

Figure 6:
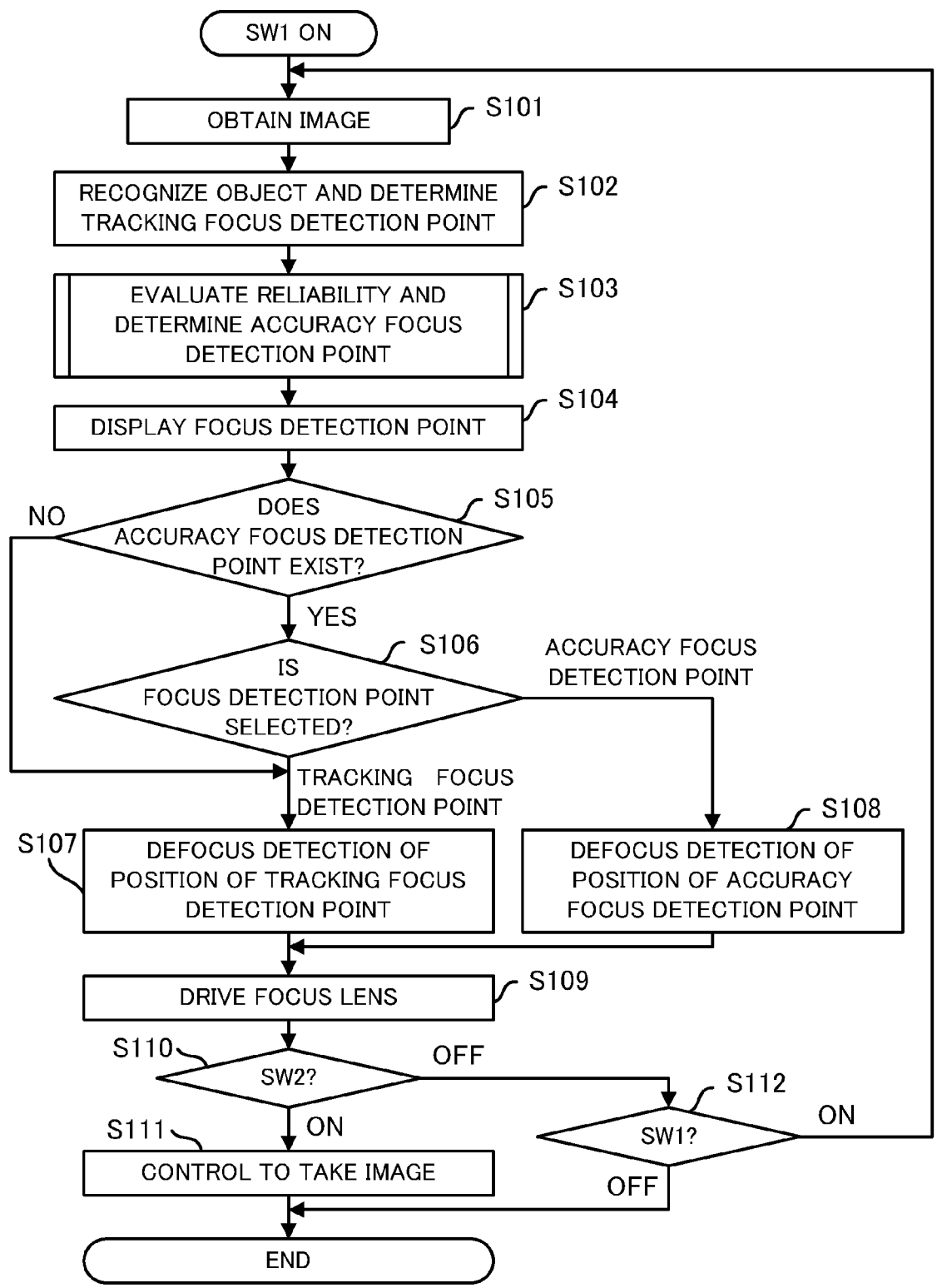
FIG. 6 is a flowchart of an AF operation and an imaging operation in the first embodiment.

An AF operation and an imaging operation of the focus detection apparatus and the camera configured as described above will be described in detail based on flowcharts of FIGS. 6 and 7.

When a switch SW1 in the switch unit 114 illustrated in FIG. 1 is pushed, the operation starts in Step S101. In Step S101, a CPU 100 controls the second image sensor 107 to obtain image information. In Step S102, the CPU 100 detects a main object position in the image information obtained by the object recognition circuit 109 in Step S101 to store the position as a tracking focus detection point.

Figure 8:
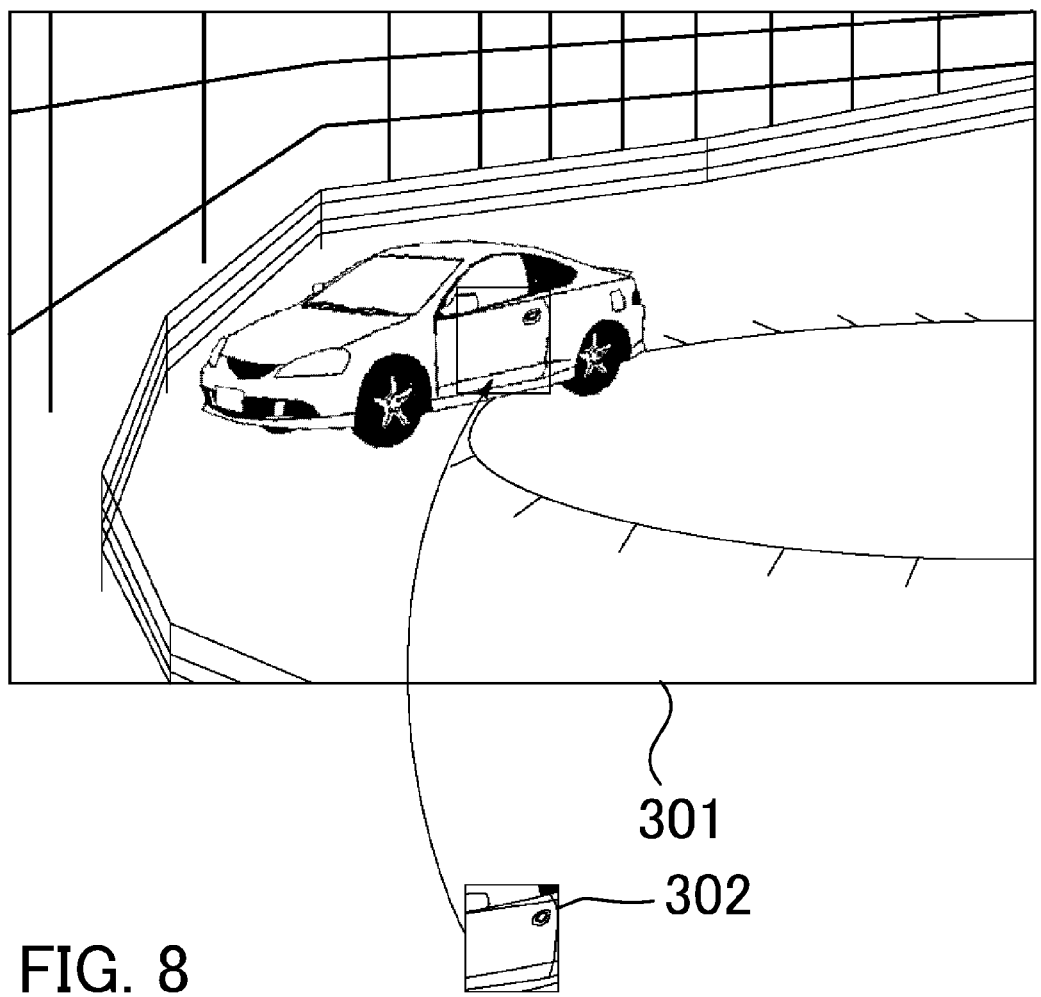
FIG. 8 is a diagram of describing a tracking process of an object recognition circuit in the first embodiment.

Referring to FIG. 8, one example of the process of the object recognition circuit 109 will be described. Reference numeral 301 denotes an image obtained by the second image sensor 107, and reference numeral 302 denotes a reference image that is a part of the main object stored previously. A correlation amount of the image is calculated (compared) while the reference image is shifted from top left of the image 301 by a predetermined amount. Then, a position where the correlation amount is the highest is set as a position of the tracking object and a focus detection point which is the closest to the position is stored in a memory circuit 112 as the tracking focus detection point.

In Step S103, the CPU 100 performs a reliability evaluation sub-routine by the AF reliability determination circuit 110 based on image information at the tracking focus detection point or near it.

Figure 7:
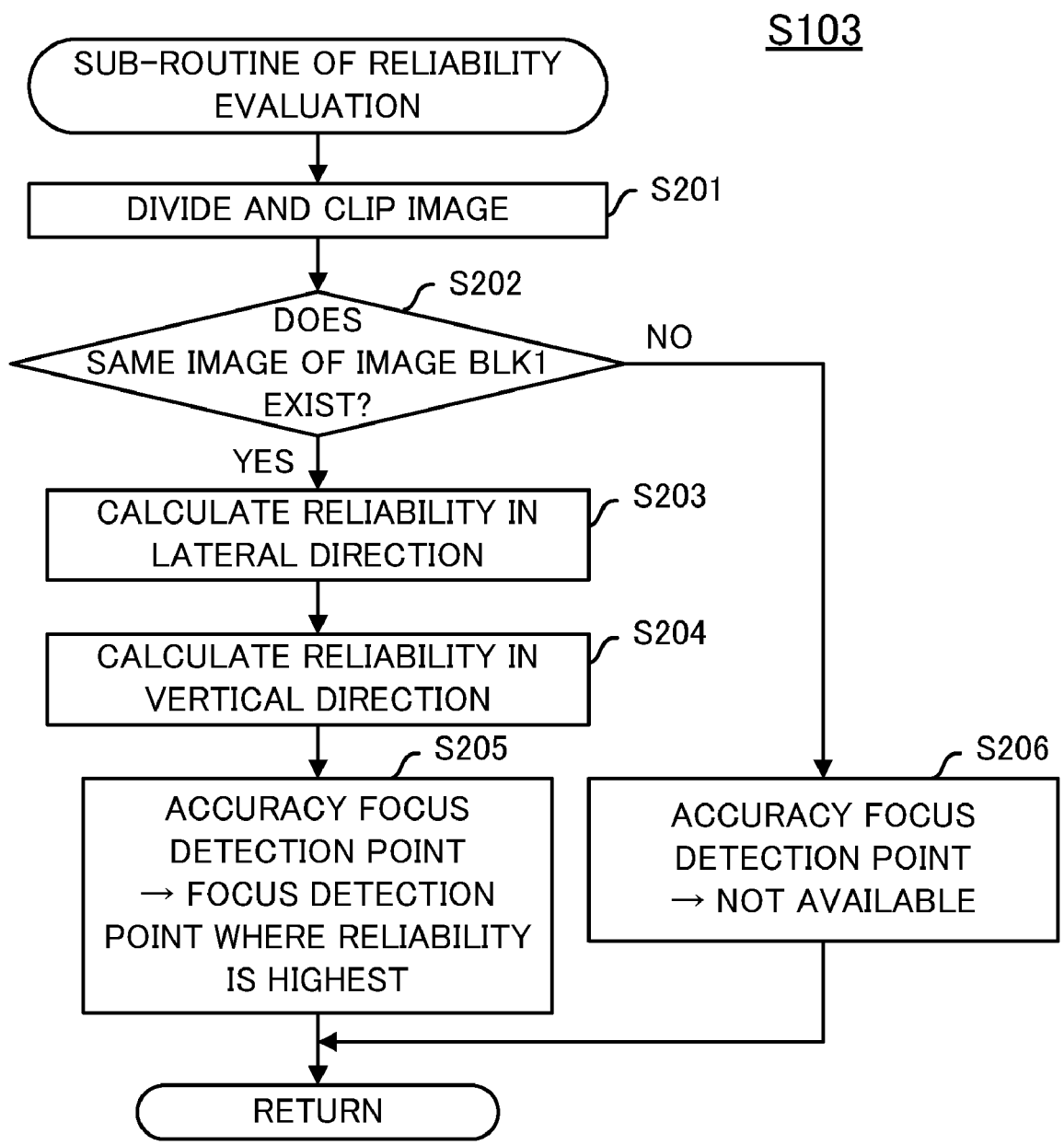
FIG. 7 is a sub-routine flowchart of a reliability evaluation in the first embodiment.
Figure 9:
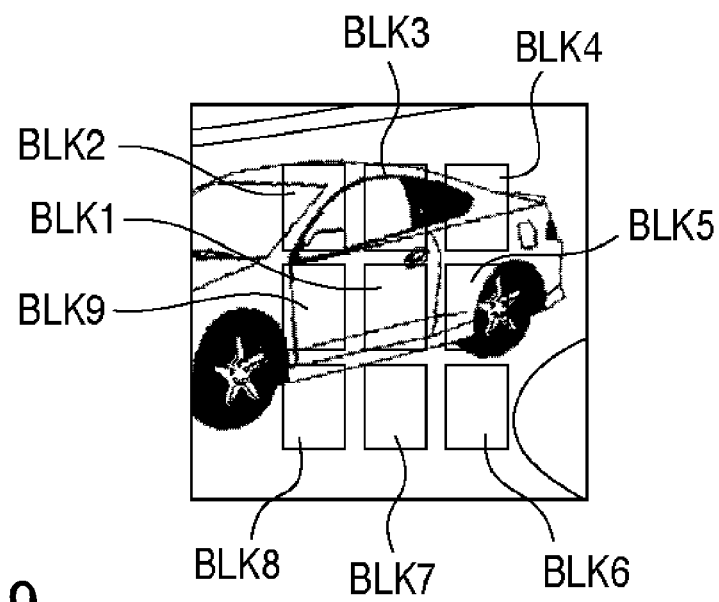
FIG. 9 is a diagram of describing a division of an image in the first embodiment.

FIG. 7 is a flowchart of the reliability evaluation sub-routine. When the process jumps from Step S103 in the main flow to Step S103 in the present sub-routine, in subsequent Step S201, the image is clipped. As illustrated in FIG. 9, with respect to the image obtained in Step S101 in the main flow, an image corresponding to the tracking focus detection point and its peripheral focus detection point is divided into nine block images (BLK1 to BLK9).

In Step S202, a color component is detected based on the block image (BLK1) corresponding to the tracking focus detection point to determine whether the same color component is contained in the other block images (BLK2 to BLK9). When the same color component is contained, the process moves to Step S203.

In Step S203, with respect to the block image in which the same color component as the color component detected from the block image BLK1 in Step S202 is contained, a calculation of a reliability determination value in performing the defocus detection by the lateral line sensors is performed. In this example, the reliability determination values of four items of "contrast value", "brightness", "color", and "direction of contrast" are calculated.

Figure 10:
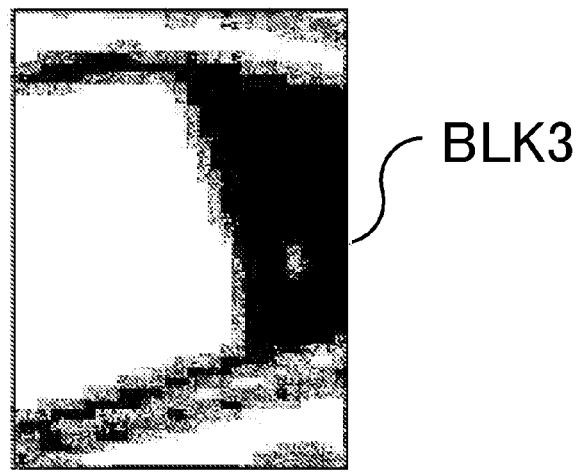
FIG. 10 is a diagram of describing a reliability determination (contrast value) in the first embodiment.
Figure 10:
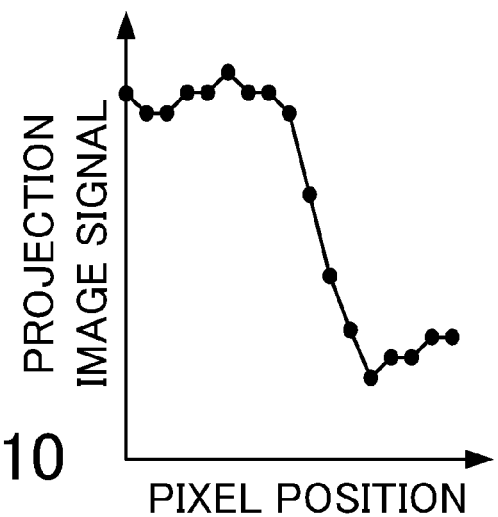

First of all, the contrast value will be described with reference to FIG. 10. When the defocus detection is performed using the field of view of the lateral line sensor, a contrast component parallel to a direction of the lateral line sensor is important. Therefore, as illustrated in FIG. 10, a projection image signal in a vertical direction of the block image is calculated. Furthermore, a differential value of adjacent bit signals of the projection image signal is integrated to calculate the contrast value.

Next, with respect to the brightness, a bright point in the block image that is an object difficult to be detected is detected. When an image in which a signal amount extremely high in a restricted range exists, it is determined that the bright point exists in the image.

With respect to the color contrast, it is determined whether a color contrast that is extremely different in the image block, for example an edge of red:blue or red:green is contained.

Figure 11:
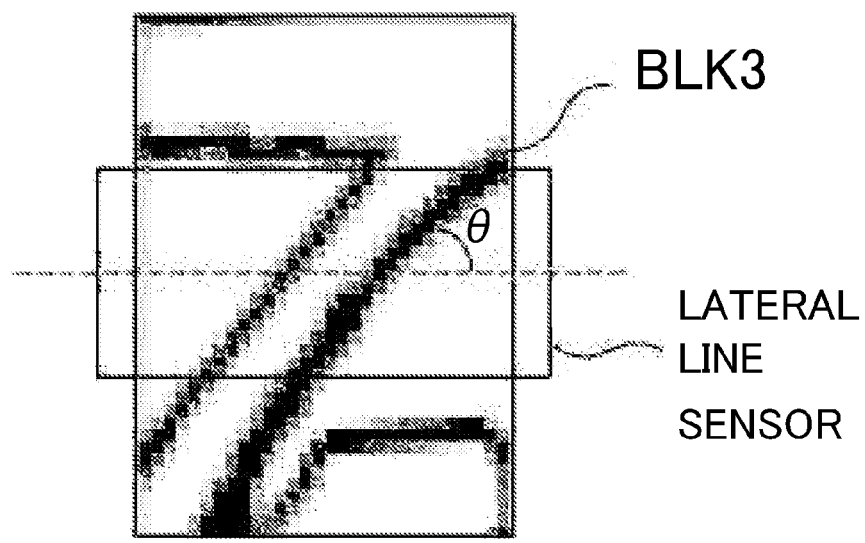
FIG. 11 is a diagram of describing a reliability determination (a direction of contrast) in the first embodiment.

With respect to the direction of contrast, as illustrated in FIG. 11, an angle θ of directions of the contrast and the line in the image block is calculated.

FIG. 12 illustrates a correspondence table of the calculation results of the above four items and the evaluation values. As the contrast value is larger, the precision of the defocus detection is improved. Accordingly, a high evaluation value is given to a large contrast value. With respect to the brightness, the evaluation value of 0 is given when the bright point exists, and on the other hand the evaluation value of 1 is given when the bright point does not exist. With respect to the color, the evaluation value of 0 is given when the color contrast exists, and on the other hand the evaluation value of 1 is given when the color contrast does not exist.

With respect to the direction of contrast, as the directions of the contrast and the line become parallel to each other, a measurement error is enlarged. Therefore, as the angle θ is close to 90 degrees, a higher evaluation value is given. A total evaluation value E is represented by the following expression, where the evaluation values of the respective items are A to D.

$$E = A \times B \times C \times D$$

In Step S204, a calculation of the reliability determination value in performing the defocus detection by the vertical line sensor is performed for the block image that contains the same color component as the color component detected from the block image BLK1 in Step S202. The reliability determination value is calculated for the same items as those of Step S203. In this case, the contrast value is calculated using the projection image signal in the lateral direction of the block image and also an angle with respect to a direction of the vertical line is detected for the direction of the contrast.

In Step S205, a block and a direction to which the highest total evaluation value of the reliability determination values (detection results of the reliability) in the lateral and the vertical directions calculated in Steps S203 and S204 are determined (determination results). Then, a focus detection point corresponding to the block position to which the highest total evaluation value is given is stored in the memory circuit 112 as an accuracy focus detection point. At the same time, a detection direction in which the total evaluation value is high is also stored in the memory circuit 112 and the process returns to the main flow.

On the other hand, when it is determined that the same color component as that of the block image (BLK1) corresponding to the tracking focus detection point is not contained in the other block images (BLK2 to BLK9), the process moves to Step S206. In Step S206, since the main object is not included in the block images BLK2 to BLK9, it is determined that a block corresponding to the accuracy focus detection point does not exist. In this case, the block of the accuracy focus detection point stored in the memory circuit 112 is cleared and the process returns to the main flow.

Figure 13A:
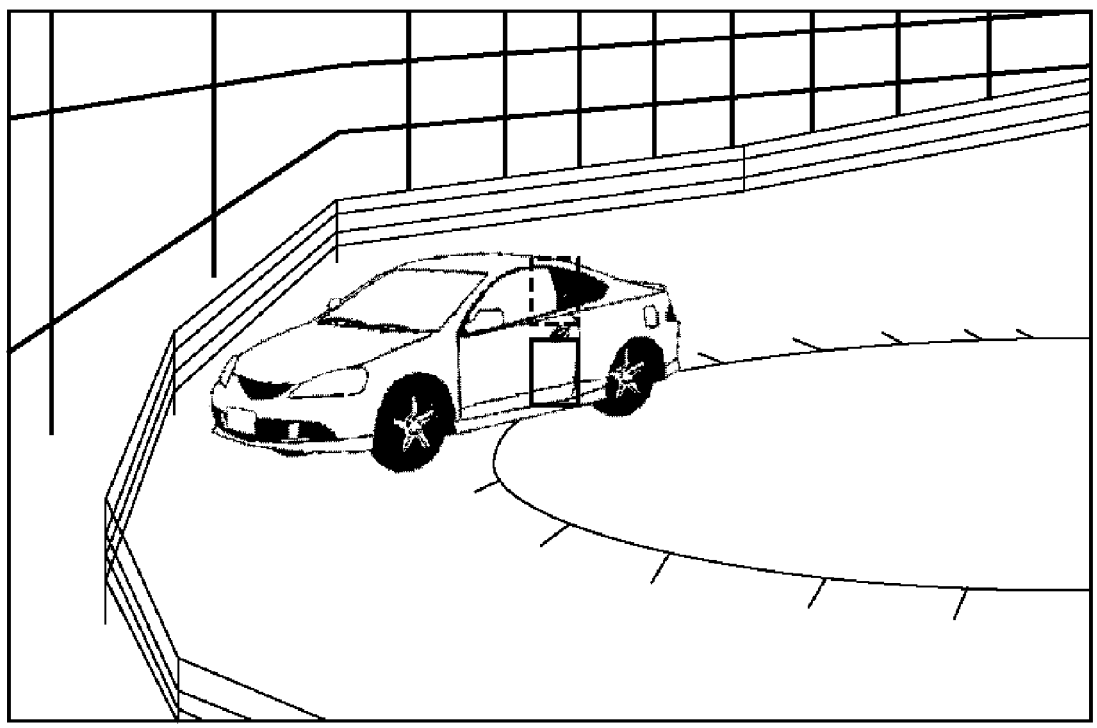
FIGS. 13A and 13B are diagrams of describing a method of displaying a focus detection point in the first embodiment.
Figure 13B:
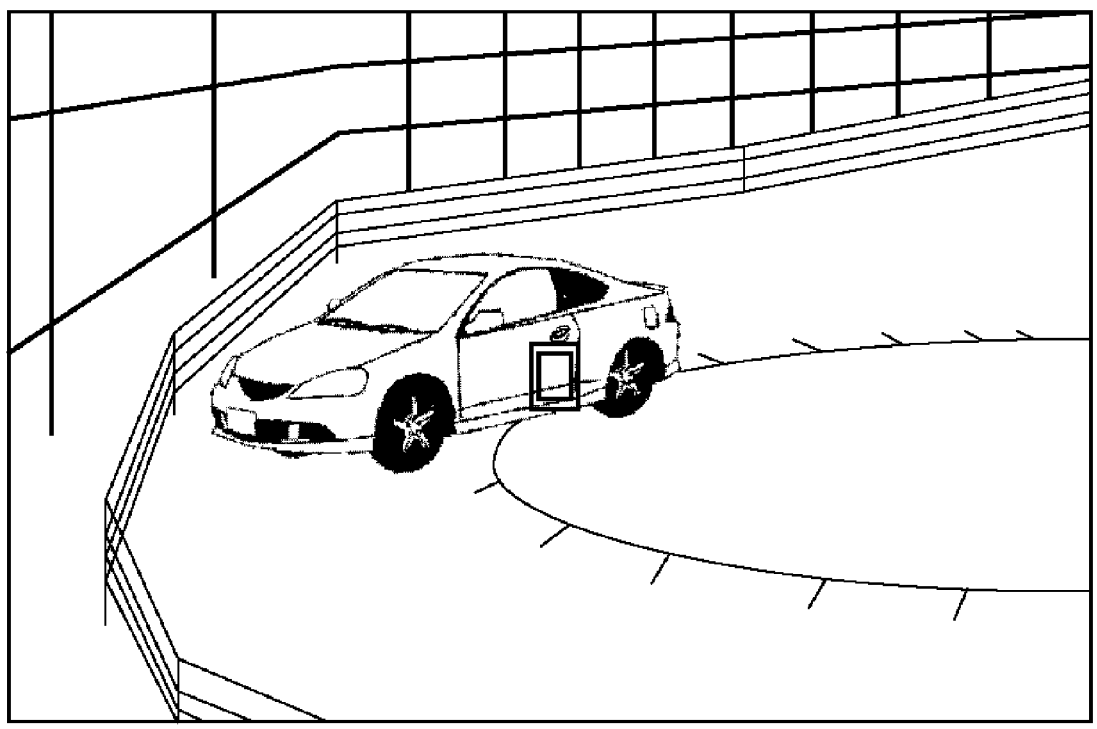

In Step S104, the CPU 100 drives the focus detection point displaying circuit 111 to display both the tracking focus detection point and the accuracy focus detection point for the user observing the finder screen 203. The focus detection point displaying circuit 111 changes a displaying shape of each of the focus detection points so that the user can recognize the difference of each of the focus detection points of the tracking focus detection point as a tracking object position and the accuracy focus detection point as a focus detection point position where the reliability of the AF result is high. FIGS. 13A and 13B illustrate images on the finder when the tracking focus detection point and the accuracy focus detection point are displayed. FIG. 13A illustrates a focus detection point frame in a case where the tracking focus detection point is different from the accuracy focus detection point, and the tracking focus detection point frame is indicated by a solid line and the accuracy focus detection point frame is indicated by a dashed line. On the other hand, FIG. 13B illustrates a focus detection point frame in a case where the tracking focus detection point is coincident with the accuracy focus detection point, and the frame is indicated by a double line.

In Step S105, based on the information stored in the memory circuit 112, the determination whether a focus detection point corresponding to the accuracy focus detection point exists is performed. When the accuracy focus detection point exists, the process moves to Step S106 to move to a selecting operation of the tracking focus detection point and the accuracy focus detection point. On the other hand, when the accuracy focus detection point does not exist, the process moves to Step S107.

In Step S106, the CPU 100 determines which is selected the tracking focus detection point or the accuracy focus detection point as a position of performing the defocus detection based on the state of a focus detection point selecting switch SW of the switch unit 114. When the tracking focus detection point is selected, the process moves to Step S107. In Step S107, pixel signals are read out from the lateral line sensors 102a and 102b and the vertical line sensors 103a and 103b corresponding to the tracking focus detection point position. Then, the correlation calculation is performed based on the read pixel signals to calculate the defocus amount.

On the other hand, when the accuracy focus detection point is selected in Step S106, the process moves to Step S108. In Step S108, the accuracy focus detection point stored in the memory circuit 112 in Step S205 and pixel signals are readout from the lateral line sensors 102a and 102b or the vertical line sensors 103a and 103b corresponding to the detection direction. Then, the correlation calculation is performed based on the read pixel signals to calculate the defocus amount.

In Step S109, based on the defocus amount calculated in Step S107 or S108, a drive control (a focusing) of the focus lens of the photographic optical system 200 is performed via the lens communication circuit 105. In Step S110, a determination whether the imaging operation or the AF operation is performed based on the state of the switch SW2 in the switch unit 114. When the switch SW2 is ON, the process moves to Step S111.

In Step S111, the CPU 100 performs photometry of an object luminance based on the image information from the second image sensor 107 to obtain the object luminance BV based on the photometry value, and calculates an aperture value AV and a shutter speed TV by a known method. Then, at the same time of jumping the quick return mirror 205 to be evacuated from an imaging optical path, the CPU 100 controls the aperture (not shown) in the lens 200 via the lens communication circuit 105 for the lens 200. Furthermore, the CPU 100 controls the current carrying time for the magnets 118a and 118b via the shutter control circuit 108 to control the shutter speed, and performs an exposure operation using the image sensor 106 while the shutter is open. After the exposure operation, the quick return mirror 205 is down to read out an imaging signal from the image sensor 106, and a sequence of the AF operation and the imaging operation is finished.

On the other hand, when the switch SW2 is OFF in Step S110, the process moves to Step S112. In Step S112, a determination whether the AF operation and the imaging operation are finished or the AF operation is continued is performed based on the state of the switch SW1 in the switch unit 114. When the switch SW1 is ON, the process moves to Step S101 to continue the AF operation. On the other hand, when the switch SW1 is OFF, the AF operation and the imaging operation are finished.

The items of the reliability evaluation and the calculation method in Step S103 described above are one example, and the present embodiment is not limited to this. Additionally, the method of displaying the focus detection point in Step S106 is one example, the tracking focus detection point and the accuracy focus detection point may be distinguished by changing the color or the display timing.

As described above, the reliability in the defocus detection is evaluated by the AF sensor 101 based on the image obtained by the second image sensor 107 (Step S103). Therefore, "the object that is difficult to be detected in accordance with the color or the contrast", which cannot be detected from the pixel signal obtained by the AF sensor 101, can be detected, and higher-precision AF control can be performed.

The focus detection point based on the tracking position information (the tracking focus detection point) and the focus detection point where the AF reliability is the highest (the accuracy focus detection point) are displayed using different display method so that the user can confirm each of the focus detection point positions (Step S104).

The user also can select a position of the AF operation using the tracking focus detection point or the accuracy focus detection point, and therefore the AF control in accordance with the intention of the user can be performed (Steps S106 to S108).

In the above embodiment, the image obtained by the second image sensor 107 is processed by the object recognition circuit 109 in the CPU 100 and the luminance distribution information and the color information of the object are obtained to detect the position of the main object that exists in the image based on the object information stored previously. Furthermore, the obtained luminance distribution information and color information are processed by the AF reliability determination circuit 110 to determine the object that is difficult to be detected by the AF sensor 101.

However, the present embodiment is not limited to this. For example, a configuration in which the luminance distribution information of the object is obtained based on the output of the AF sensor 101 without using the second image sensor 107 to detect the position of the main object that exists in the image based on the object information stored previously may also be adopted. Furthermore, a configuration in which the obtained luminance distribution information is processed by the AF reliability determination circuit 110 to determine the object that is difficult to be detected by the AF sensor 101 may also be adopted.

Hereinafter, a method of obtaining the luminance distribution information of the object using the AF sensor will be described in detail.

Second Embodiment

Figure 15:
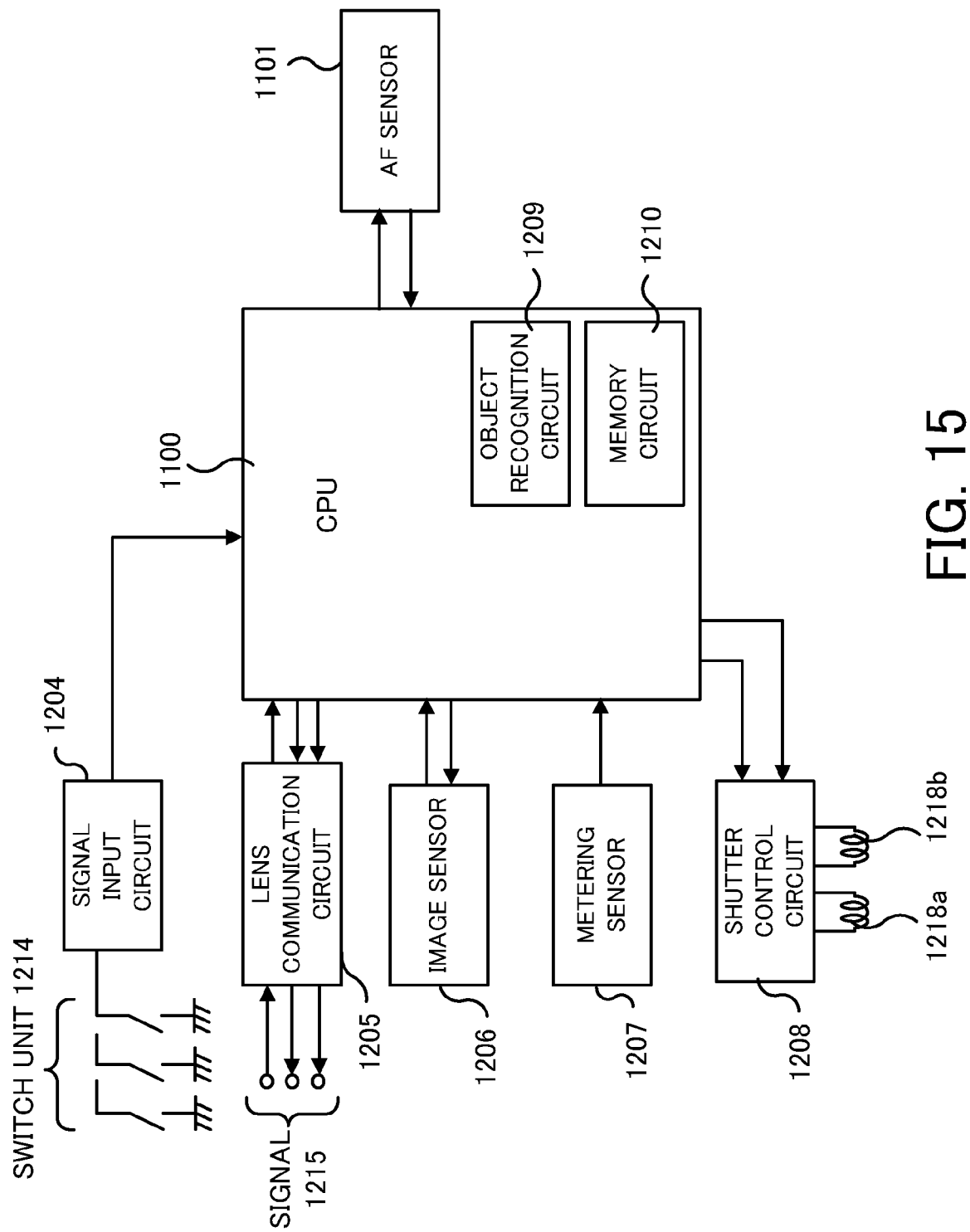
FIG. 15 is a configuration diagram of a camera in the second embodiment.

First of all, a camera of the present embodiment will be described. FIG. 15 is a block diagram illustrating a configuration of the camera in the present embodiment. A camera microcomputer (hereinafter, referred to as a "CPU") 1100 is connected with a signal input circuit 1204 to detect a signal from a switch unit 1214 containing various kinds of switches provided in the camera. The CPU 1100 is also connected with an image sensor 1206, a metering sensor 1207 (an AE sensor), a shutter control circuit 1208 that controls shutter magnets 1218a and 1218b, and an AF sensor 1101. Furthermore, the CPU 1100 transmits a signal 1215 to a photographic optical system (not shown) via a lens communication circuit 1205 to control a focal position and an aperture. The operation of the camera is determined by a setting of the switch unit 1214.

The AF sensor 1101 has an area sensor that is configured by arraying pixels in a matrix. The CPU 1100 detects a defocus amount based on a contrast distribution of an object obtained by the area sensor to control the focal position of the photographic optical system. The AF sensor 1101 also has a function that takes an image for object recognition.

The CPU 1100 determines an aperture value and a shutter speed of the photographic optical system based on the luminance of the object detected by the metering sensor 1207. The CPU 1100 also controls the aperture value via the lens communication circuit 1205 and controls a current carrying time of the shutter magnets 1218a and 1218b via the shutter control circuit 1208 to perform a shutter speed control. Furthermore, the CPU 1100 controls the imaging sensor 1206 to perform an imaging operation. The CPU 1100 is embedded with an object recognition circuit 1209 to perform the object recognition and the tracking operation based on an image from the AF sensor 1101. The CPU 1100 is also embedded with a memory circuit 1210 such as a ROM that stores a program to control the camera operation, a RAM that stores a variable, and an EEPROM (Electronically Erasable and Programmable Read Only Memory) that stores various kinds of parameters.

Figure 16:
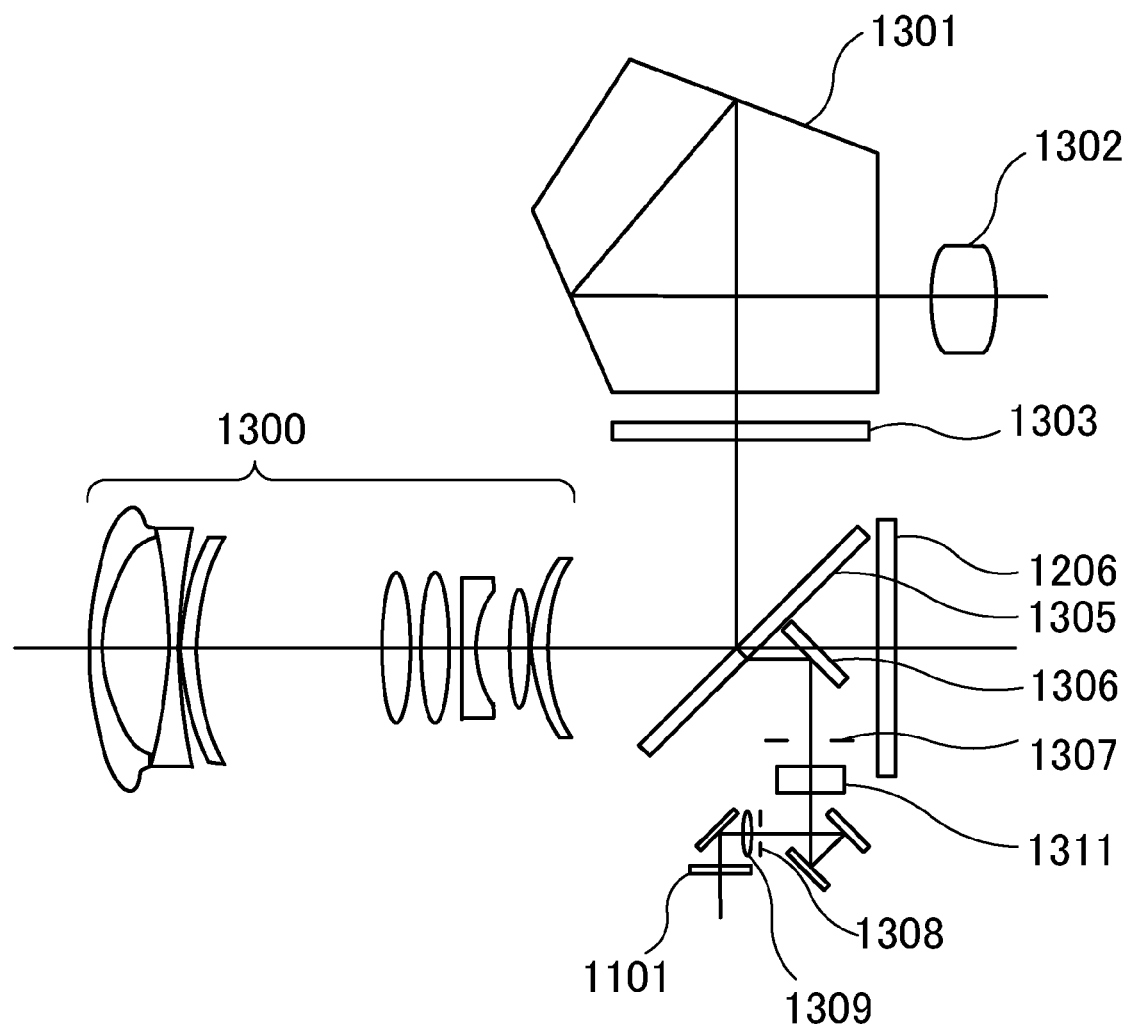
FIG. 16 is an optical configuration diagram of a camera in the second embodiment.

Next, an optical configuration of the camera in the present embodiment will be described. FIG. 16 is an optical configuration diagram of the camera. A large part of incident light from the object via a photographic optical system 1300 is reflected upward by a quick return mirror 1305 to form an image on a finder screen 1303. The user of the camera observes this image via a pentaprism 1301 and an eyepiece lens 1302.

A part of the image light transmits through the quick return mirror 1305 to be bent downward by a sub-mirror 1306 in the back, and then forms an image on the AF sensor 1101 via a field of view mask 1307, a field lens 1311, an aperture 1308, and a secondary imaging lens 1309. The CPU 1100 processes an image signal obtained by the photoelectric conversion of this image to be able to detect a focus state of the photographic optical system 1300. In taking an image, the quick return mirror 1305 jumps up and all of the image lights are imaged on the image sensor 1206 to expose an object image.

Figure 17:
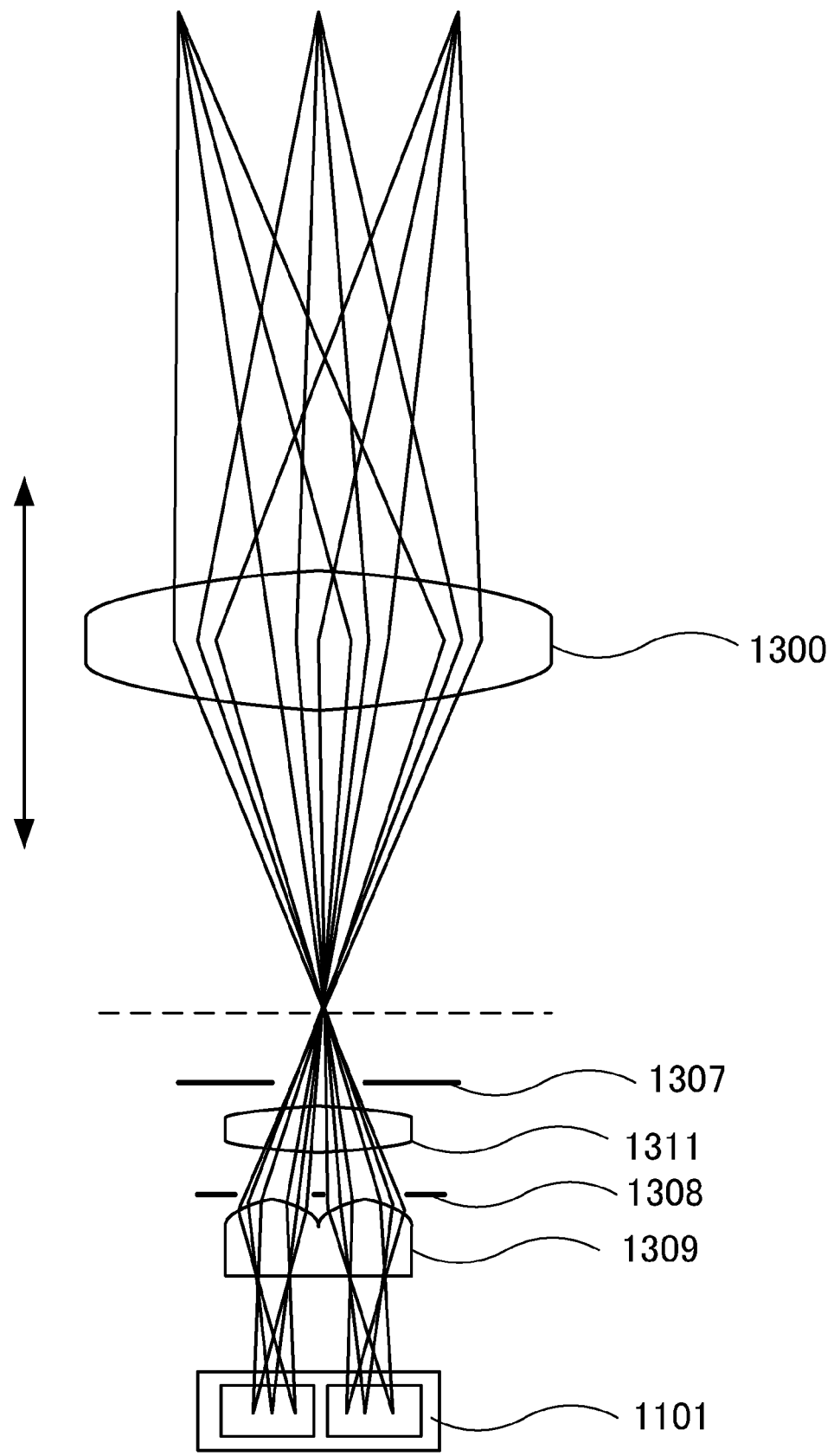
FIG. 17 is an optical configuration diagram in performing focus detection in the second embodiment.

A known phase detection method is used as a focus detection method in the present embodiment, and focus state in a plurality of different areas in a screen can be detected. FIG. 17 is a detail configuration diagram of an optical system in the focus detection. The light transmitted through the photographic optical system 1300 from the object is reflected by the sub-mirror 1306 and forms an image near the field of view mask 1307 that is positioned on a plane conjugate with an image plane once. FIG. 17 illustrates a developed optical path that is reflected and returned by the sub-mirror 1306. The field of view mask 1307 is a member that is used for shielding an extra light other than a focus detection area (a focus detection point) in the screen.

The field lens 1311 has a function of forming an image near an exit pupil of the photographic optical system 1300 for each opening of the aperture 1308. The secondary imaging lens 1309 constituted of a pair of two lenses behind the aperture 1308, and each of the lenses corresponds to each opening of the aperture 1308. Each light transmitted through the field of view mask 1307, the field lens 1311, the aperture 1308, and the secondary imaging lens 1309 forms an image on the area sensor on the AF sensor 1101. The AF sensor 1101 is configured so as to be able to form an image for the light from a different object in the shooting screen.

Figure 18:
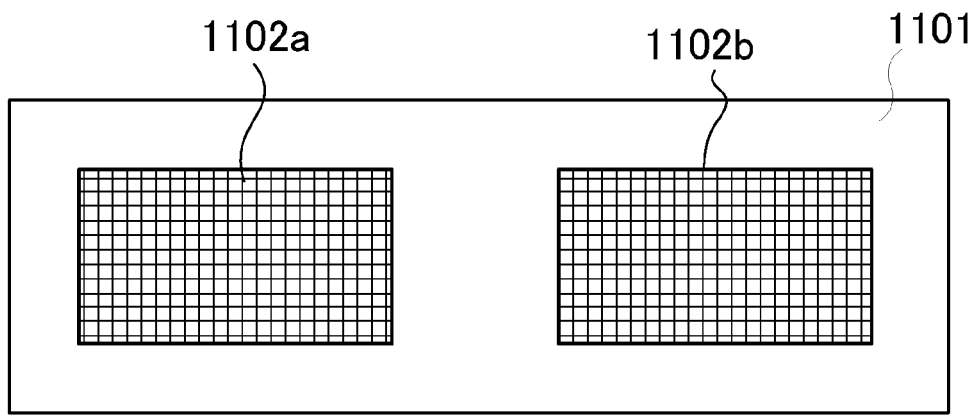
FIG. 18 is an arrangement diagram of area sensors in an AF sensor of the second embodiment.
Figure 19A:
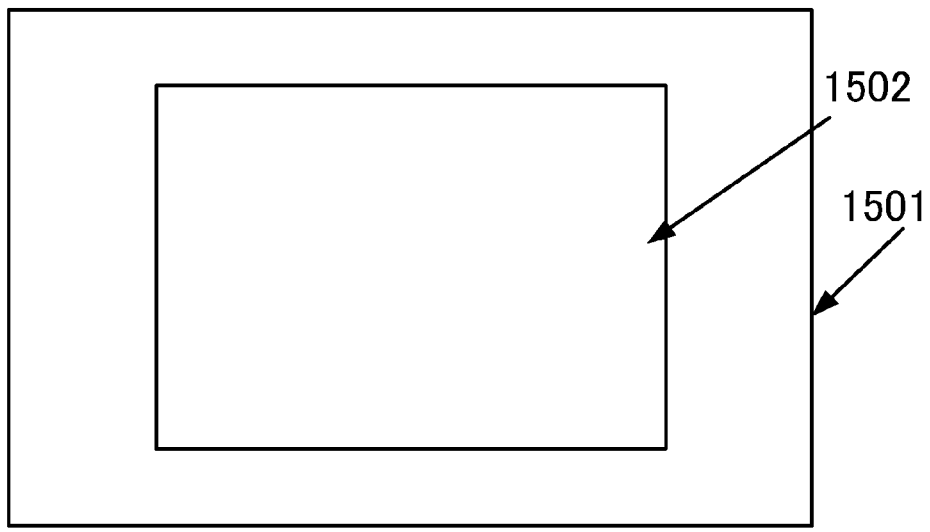
FIGS. 19A and 19B are arrangement diagrams of field of view for focus detection and field of view for object recognition in the second embodiment.
Figure 19B:
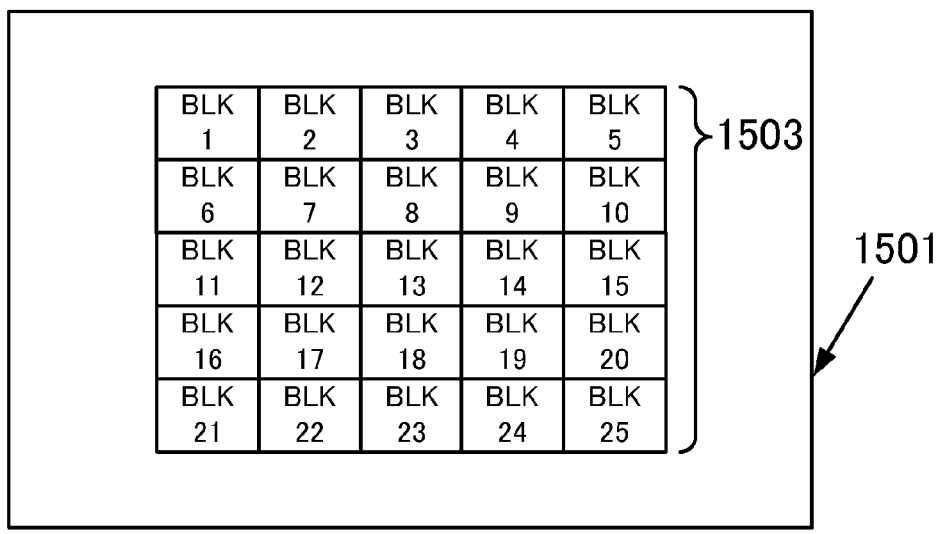

The field of view of the area sensor on the AF sensor 1101 in the shooting screen will be described with reference to FIG. 18 and FIGS. 19A and 19B. FIG. 18 is an arrangement diagram of the area sensor in the AF sensor 1101. Each of the area sensors 1102a and 1102b is configured by arraying a plurality of pixels in a matrix, which accumulates an image signal from the light transmitted through the photographic optical system 1300 in the plurality of pixels. The area sensors 1102a and 1102b optically have a paired relation by the secondary imaging lens 1309. FIGS. 19A and 19B are diagrams of position relations of the field of view of the finder and the field of view of the AF sensor (a field of view of the object recognition, and a field of view of the focus detection). FIG. 19A is a field of view of the object recognition 1502 in the area sensors 1102a and 1102b, which receives light from almost the entire area of the field of view of the finder 1501. On the other hand, FIG. 19B is a field of view of the focus detection 1503 in the area sensors 1102a and 1102b, which has the same size of the entire field of view and forms a field of view of 25 blocks by dividing the area sensors 1102a and 1102b into 5×5 using blocks having a predetermined size. Thus, the field of view of the focus detection 1503 is provided so as to correspond to the 25 focus detection points. Hereinafter, FIG. 19A is referred to as a first pattern and FIG. 19B is referred to as a second pattern.

Next, referring to a block diagram of FIG. 14, a detail circuit configuration of the AF sensor 1101 will be described. Each of the area sensors 1102a and 1102b is constituted by opening pixels for receiving light of the object image and light-shielding OB pixels (optical black pixels). The object image that is imaged by the secondary imaging lens 1309 is photoelectrically converted by the area sensors 1102a and 1102b, and a signal converted into a voltage is accumulated in the area sensors 1102a and 1102b.

A block selecting circuit 1103 (a selector) divides the area sensors 1102a and 1102b into blocks using a predetermined pattern (a dividing pattern). The dividing pattern is two dividing pattern (the first pattern and the second pattern) that is described with reference to FIGS. 19A and 19B. In other words, the block selecting circuit 1103 selects one pattern of the first pattern that is constituted as a single block and the second pattern that is constituted as a plurality of blocks for the area sensors 1102a and 1102b. The block selecting circuit 1103 has a function that sends an accumulation signal of pixel group corresponding to each block to a P-B signal detection circuit 1104, a P-OB signal detection circuit 1105, first frame memories 1108a and 1108b, and second frame memories 1109a and 1109b.

Figure 22:
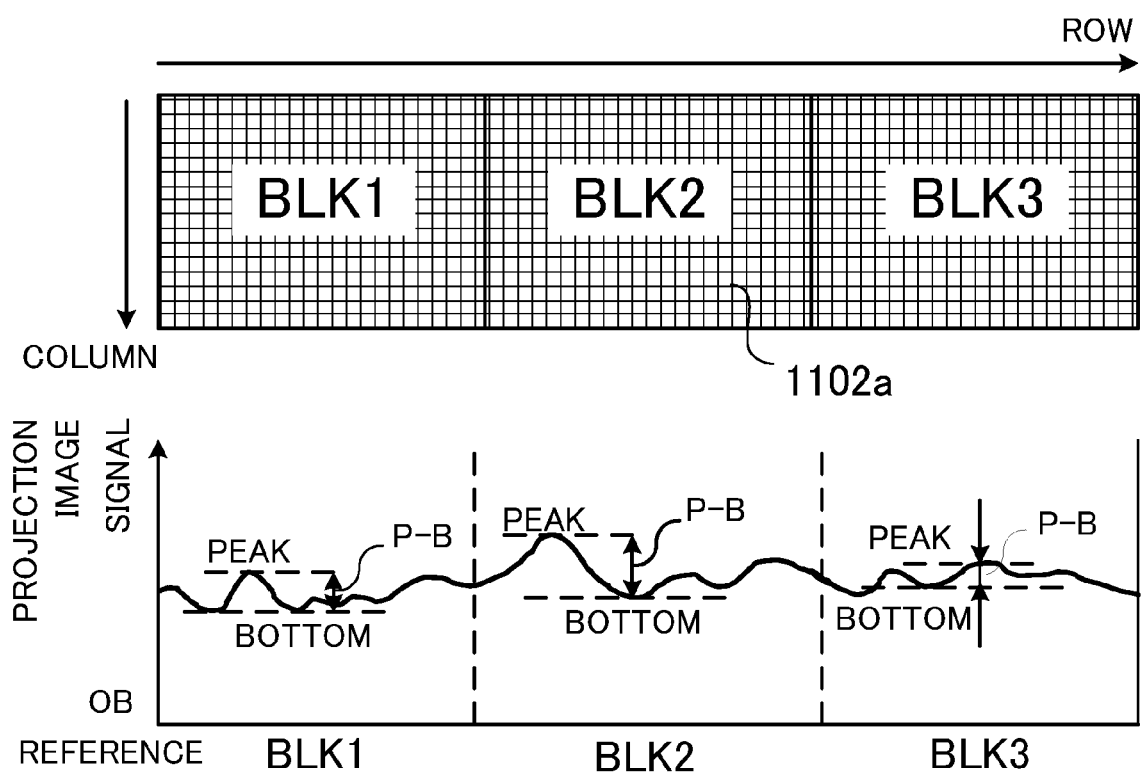
FIG. 22 is a diagram of describing a P-B signal processing in the second embodiment.

The P-B signal detection circuit 1104 processes the pixel signal in each block of the second pattern (BLK1 to BLK25) to detect a P-B signal. Referring to FIG. 22, a method of detecting the P-B signal is described in detail. FIG. 22 is a diagram illustrating an image signal that is obtained by processing a pixel signal of each block, which is focused on a pixel group of the blocks (BLK1 to BLK3) of the area sensor 1102a. A plurality of pixels are arrayed in a matrix in each block. The configuration of the area sensors 1102b is also the same as that of the area sensor 1102a. When a vertical direction and a lateral direction are defined as a column and a row, respectively, the P-B signal detection signal circuit 1104 calculates a projection image signal that is obtained by adding the pixel signals contained in the same column. Then, the P-B signal detection signal 1104 detects a differential signal (P-B signal) of the maximum signal (peak signal) and the minimum signal (bottom signal) of the projection image signal in each block.

Figure 14:
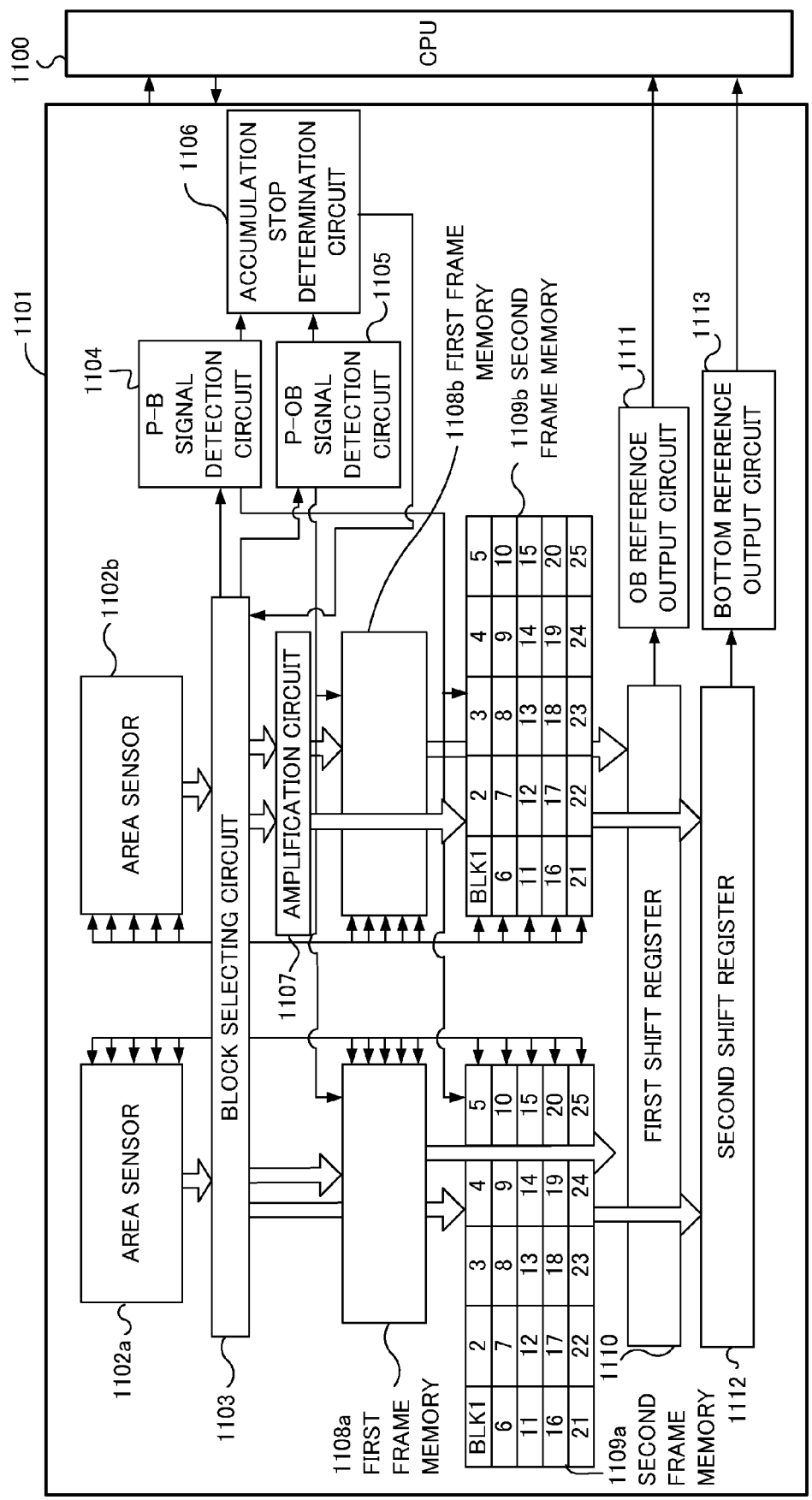
FIG. 14 is a configuration diagram of an AF sensor in the second embodiment.

In FIG. 14, the P-OB signal detection circuit 1105 detects a differential signal (P-OB signal) of the maximum signal (peak signal) of the first pattern i.e. all the pixel signals of the area sensors 1102a and 1102b and the OB pixel signal (optical black pixel signal). An accumulation stop determination circuit 1106 determines accumulation stop timing based on the P-B signal or the P-OB signal.

An amplification circuit 1107 (an amplifier) is a circuit that amplifies the pixel signal in storing the pixel signal of the area sensor 1102b in the first frame memory 1108b and the second frame memory 1109b. The amplification circuit 1107 is configured so as to be switched between two amplification ratios (a first amplification ratio and a second amplification ratio) of ×1 and ×4 as amplification ratios. For example, the amplification circuit 1107 generates an object recognition signal by amplifying the pixel signal obtained by selecting the first pattern with the first amplification ratio, and also generates a focus detection signal by amplifying the pixel signal obtained by selecting the second pattern with the second amplification ratio different from the first amplification ratio. The first amplification ratio and the second amplification ratio are not limited to ×1 and ×4 respectively, and other amplification ratios may also be used.

The first frame memories 1108a and 1108b (the memory) are circuits that store the object recognition signal, which collectively store entire screen signals (pixel signals) obtained by selecting the first pattern as the object recognition signal. Furthermore, the first frame memories 1108a and 1108b store the OB pixel signal detected by the P-OB signal detection circuit 1105 at the same time of storing the pixel signals. The second frame memories 1109a and 1109b (the memory) are circuits that store the focus detection signal, which store signals (pixel signals) every blocks (BLK1 to BLK25) obtained by selecting the second pattern which corresponds to 25 focus detection points as the focus detection signal. Furthermore, the second frame memories 1109a and 1109b store the bottom signal for every block detected by the P-B signal detection circuit 1104 at the same time of storing the pixel signals.

A first shift register 1110 is driven by the control of the CPU 1100 to select the object recognition signals stored in the first frame memories 1108a and 1108b in order, and the signals are sent to an OB reference output circuit 1111. The OB reference output circuit 1111 clamps the pixel signals stored in the first frame memories 1108a and 1108b to an OB signal reference stored in the first frame memories 1108a and 1108b to perform a signal amplification processing to output the pixel signals. An A/D conversion of the pixel signal outputted from the OB reference output circuit 1111 is performed by an AD converter (not shown) in the CPU 1100.

A second shift register 1112 is driven by the CPU 1100 to select the focus detection signals stored in the second frame memories 1109a and 1109b in order, and the signals are sent to a bottom reference output circuit 1113. The bottom reference output circuit 1113 clamps the pixel signals stored in the second frame memories 1109a and 1109b to a bottom signal reference stored in the second frame memories 1109a and 1109b to perform a signal amplification processing to output the pixel signals. An A/D conversion of the pixel signal outputted from the bottom reference output circuit 1113 is performed by an AD converter (not shown) in the CPU 1100.

Referring to a flowchart of FIG. 20, the focus detection operation of the focus detection apparatus (the camera) configured as described above will be described in detail. First of all, in Step S1101, a signal accumulation sub-routine is performed by the AF sensor 1101 that receives a control command from the CPU 1100. In other words, when the CPU 1100 receives a start signal of the focus detection by the operation of the switch unit 1214, it controls the AF sensor 1101 to perform the signal accumulation operation.

Figure 21:
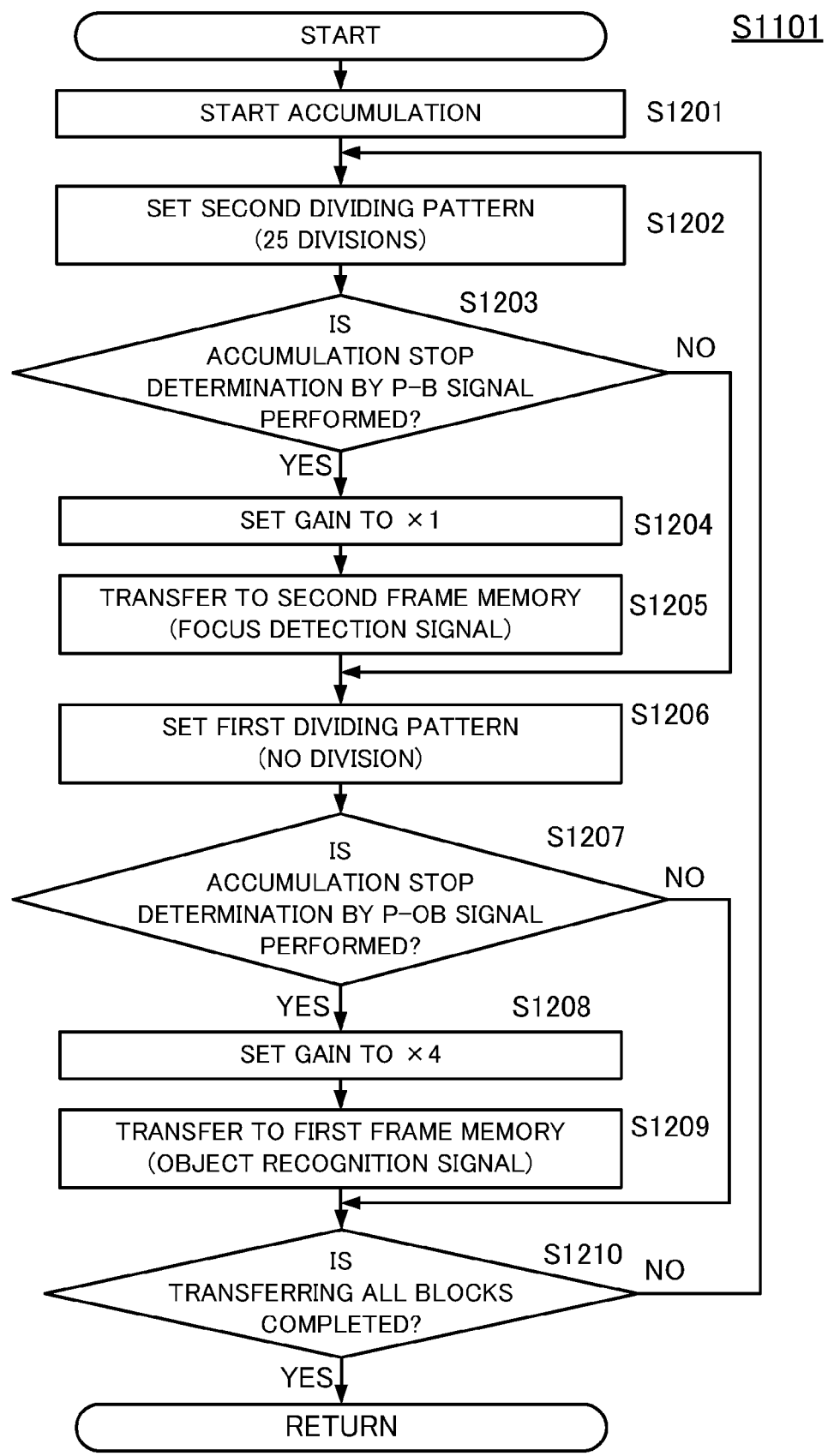
FIG. 21 is a sub-routine flowchart of an accumulation operation in the second embodiment.

FIG. 21 is a flow chart of the signal accumulation sub-routine performed by the AF sensor 1101. In the signal accumulation sub-routine (Step S1101), first of all, in Step S1201, signal accumulations of the area sensors 1102a and 1102b is started by a control circuit in the AF sensor 1101. Next, in Step S1202, a dividing pattern by the block selecting circuit 1103 is set to the second pattern.

In Step S1203, an accumulation stopping determination of each block of the second pattern (25 division) selected in Step S1202 is performed. The block selecting circuit 1103 sends the signal of each block (BLK1 to BLK25) to the P-B signal detection circuit 1104, and the P-B signal is detected by the P-B signal detection circuit 1104. The P-B signal of each block is compared with a stop level by the accumulation stop determination circuit 1106, and the process moves to Step S1204 when the P-B signal is equal to or greater than the stop level. On the other hand, when the P-B signal does not reach the stop level, it is determined that the accumulation signal is insufficient and the process moves to Step S1206. In Step S1204, the amplification ratio (the second amplification ratio) of the amplification circuit 1107 is set to ×1.

In Step S1205, the pixel signal of the block for which the accumulation stop determination has been performed in Step S1203 is stored in the second frame memories 1109a and 1109b. At the same time, the bottom signal detected by the P-B signal detection circuit 1104 is stored in the second frame memories 1109a and 1109b. The pixel signal having a sufficient P-B signal amount for each of the 25 divided blocks for the focus detection is stored in the second frame memories 1109a and 1109b. Therefore, the signals between blocks are discontinuous signals.

In Step S1206, the dividing pattern performed by the block selecting circuit 1103 is set to the first pattern. In Step S1207, the accumulation stop determination is performed using the first pattern (no division) selected in Step S1206. The block selecting circuit 1103 sends signals of all the pixels of the area sensors 1102a and 1102b to the P-OB signal detection circuit 1105, and the P-OB signal is detected by the P-OB signal detection circuit 1105. The P-OB signal is compared with the stop level by the accumulation stop determination circuit 1106, and the process moves to Step S1208 when the P-OB signal is equal to or greater than the stop level. On the other hand, when the P-OB signal does not reach the stop level, it is determined that the accumulation signal is insufficient and the process moves to Step S1210. In Step S1208, the amplification ratio (the first amplification ratio) of the amplification circuit 1107 is set to ×4.

In Step S1209, all pixel signals for which the accumulation stop determination has been performed in Step S1207 are stored in the first frame memories 1108a and 1108b. At the same time, the OB signal detected by the P-OB signal detection circuit is stored in the first frame memories 1108a and 1108b. All pixel signals of the area sensor 1102a are simultaneously stored as an object recognition signal in the first frame memory 1108a. Therefore, the pixel signals are continuous signals. All pixel signals of the area sensor 1102b for which an amplification process of ×4 has been performed are simultaneously stored as an object recognition signal in the first frame memory 1108b. Since the amplification process of ×4 has been performed for this pixel signal, it is suitable for a recognition process for a dark object.

In Step S1210, whether storing operations to the first and second frame memories for all the blocks of the first pattern and the second pattern have been performed is determined. When the storing operation of the pixel signals of any one of the blocks has not been finished, the process returns to Step S1202, and the accumulation and accumulation stop determination operation are repeatedly performed for the block for which the storing operation has not been finished yet. On the other hand, when the storing operations for all the blocks have been finished, the process returns to the main flow of FIG. 20.

Figure 20:
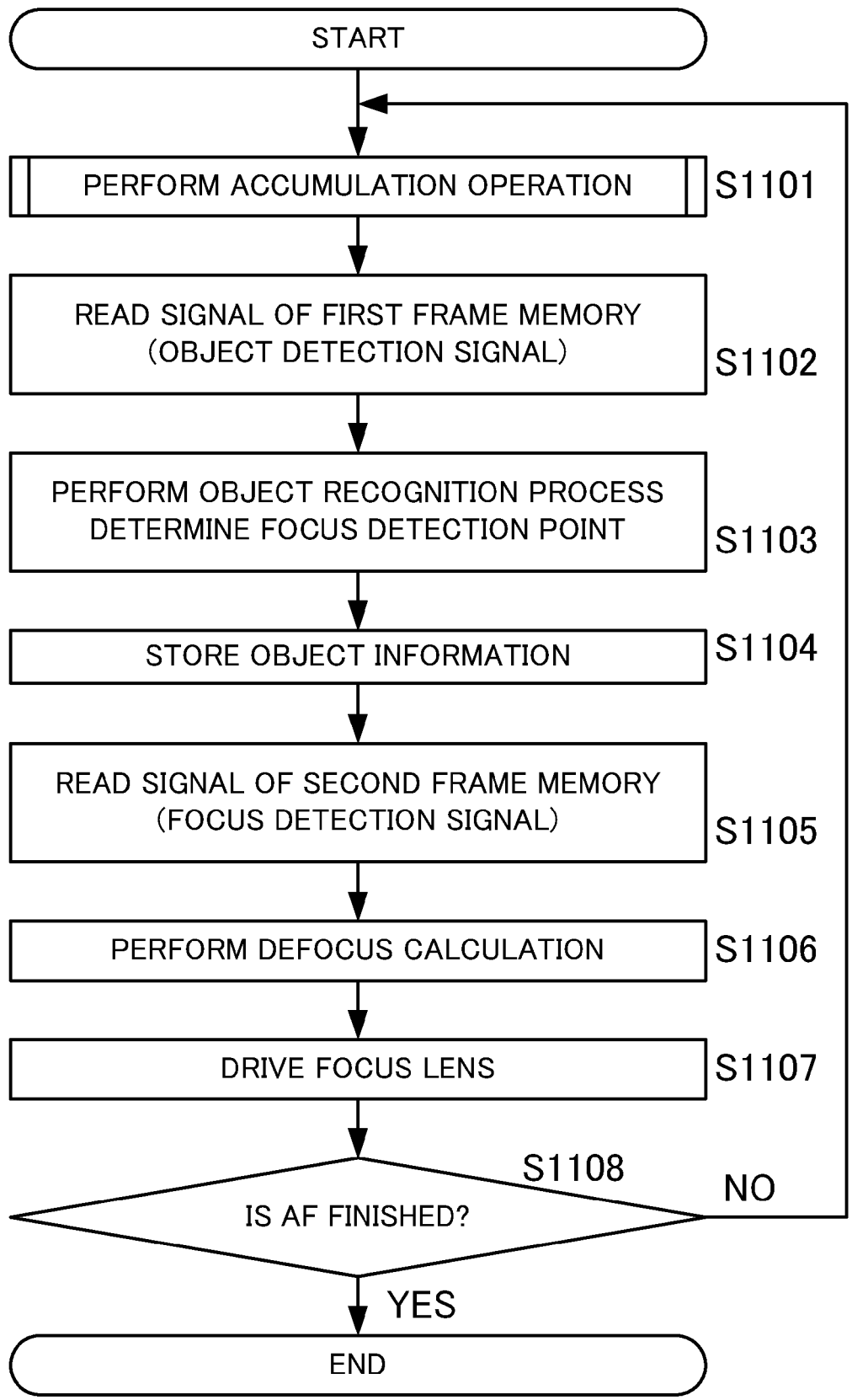
FIG. 20 is a flowchart of a focus detection operation in the second embodiment.

In FIG. 20, in Step S1102, the pixel signals stored in the first frame memories 1108a and 1108b as the object recognition signal are read out by the CPU 1100. The first shift register 1110 is driven in accordance with the instruction of the CPU 1100 to select the pixel signals of the first frame memories 1108a and 1108b every pixel in order to be sent to the OB reference output circuit 1111. Furthermore, an AD conversion is performed by an AD converter (not shown) in the CPU 1100 for the pixel signal which is clamped to the OB signal reference stored in the first frame memories 1108a and 1108b and for which the signal amplification process has been performed. Thus, the object recognition signal is generated by a signal obtained from the optical black pixel as a reference.

In Step S1103, based on the pixel signal (the object recognition signal) obtained in Step S1102, an object recognition process is performed by the object recognition circuit 1209 in the CPU 1100. The object recognition circuit 1209 generates an image based on the pixel signal obtained in Step S1102 and compares the image with a reference image of the object stored previously to detect a position of the object. A focus detection point is also determined based on the detected object position. In Step S1104, the image signal corresponding to the position of the object detected in Step S1103 is updated and stored as a new reference image of the object.

In Step S1105, the pixel signals stored in the second frame memories 1109a and 1109b as the focus detection signal are read out by the CPU 1100. In order to read out the pixel signal from the block at the focus detection block determined in Step S1103, the second shift register 1112 is driven. In this case, a pixel signal for every pixel of the second frame memories 1109a and 1109b is sequentially selected to be sent to the bottom reference output circuit 1113. Furthermore, an AD conversion is performed by an AD converter (not shown) in the CPU 1100 for the pixel signal which is clamped to the bottom signal reference stored in the second frame memories 1109a and 1109b and for which the signal amplification process has been performed. Thus, the focus detection signal is generated based on the minimum signal in the plurality of blocks constituting the second pattern as a reference.

Next, in Step S1106, the CPU 1100 performs a correlation calculation based on the pixel signal for which the AD conversion has been performed in Step S1105 to calculate a defocus amount. Thus, the CPU 1100 is a calculator that recognizes the position of the object based on the object recognition signal to calculate the defocus amount based on the focus detection signal in one block of the second pattern corresponding to the position of the object. In Step S1107, the CPU 1100 also performs a drive control of the focus lens of the photographic optical system 1300 via the lens communication circuit 1205 based on the defocus amount calculated in Step S1106.

In Step S1108, whether the focus detection operation is continued is determined. When the CPU 1100 receives a continuation signal of the focus detection by the operation of the switch unit 1214, the process returns to Step S1101 to repeat the object recognition operation and the focus detection operation. On the other hand, when the CPU 1100 receives an end signal of the focus detection by the operation of the switch unit 1214, it finishes a sequence of focus detection operations.

Figure 23A:
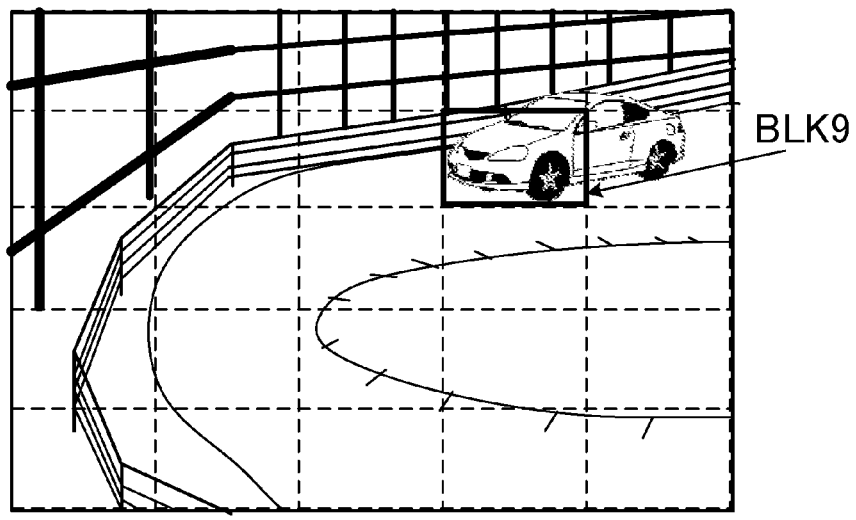
FIGS. 23A to 23C are an example of images of a focus detection operation in the second embodiment.
Figure 23B:
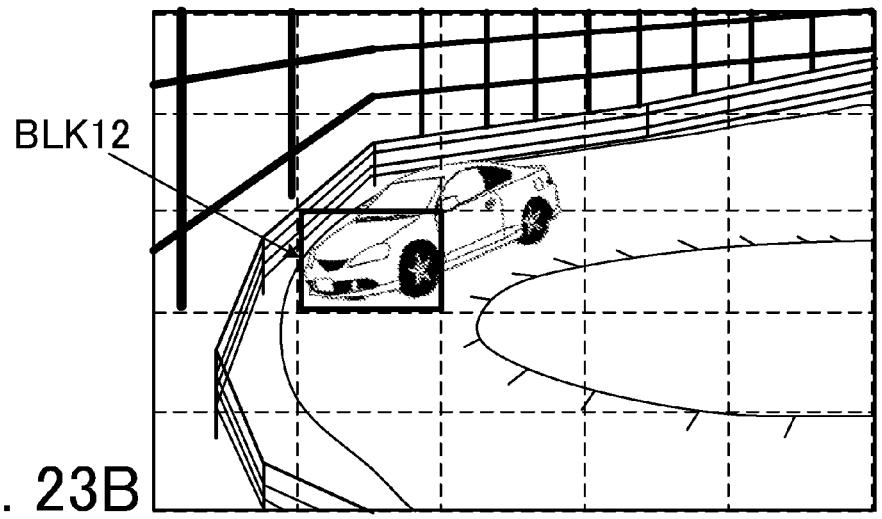
Figure 23C:
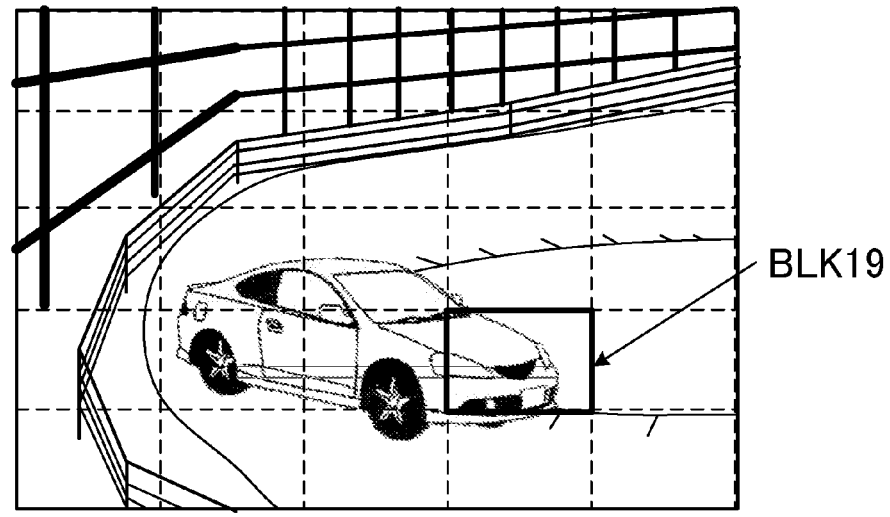

Next, referring to FIGS. 23A to 23C and FIG. 24, a flow of the focus detection operation of FIG. 20 will be described using one example of real pixel signals. FIGS. 23A to 23C are images that are obtained by performing the series of operations of Steps S1101 to S1108 to be generated based on pixel signals read from the first frame memory 1108a. The pixel signals obtained from the first frame memory 1108a are signals for which a block division have not been performed and that are obtained based on the OB pixel signal as a reference. Therefore, the images illustrated in FIGS. 23A to 23C are images that have high correlation of the luminance distribution each other.

First of all, the pixel signals are read out from the first frame memory 1108a in a first signal accumulation operation (Steps S1101 and S1102). The CPU 1100 generates the image of FIG. 23A based on the read pixel signals, and compares the image with a reference image stored previously to determine the position of the object. In the present embodiment, the existence of the object near the image BLK9 is detected and the image near the image BLK9 is stored as a new reference image (Steps S1103 and S1104).

Figure 24:
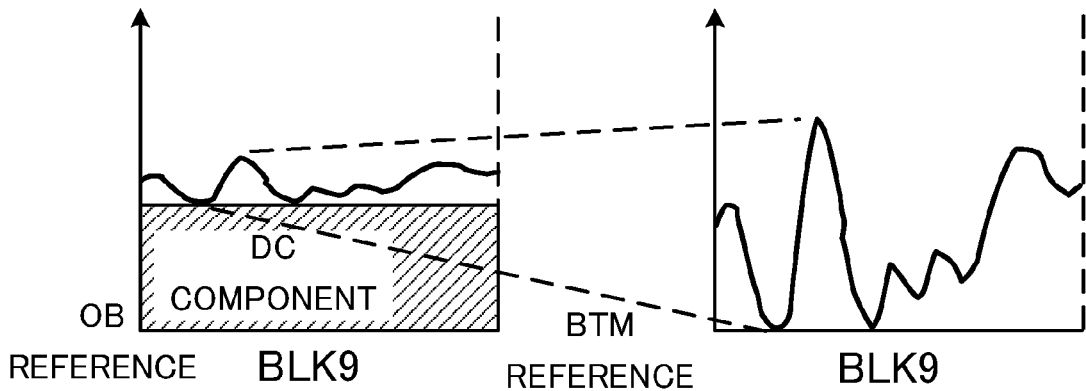
FIG. 24 is a diagram of describing an output processing of a focus detection signal in the second embodiment.
Figure 25:
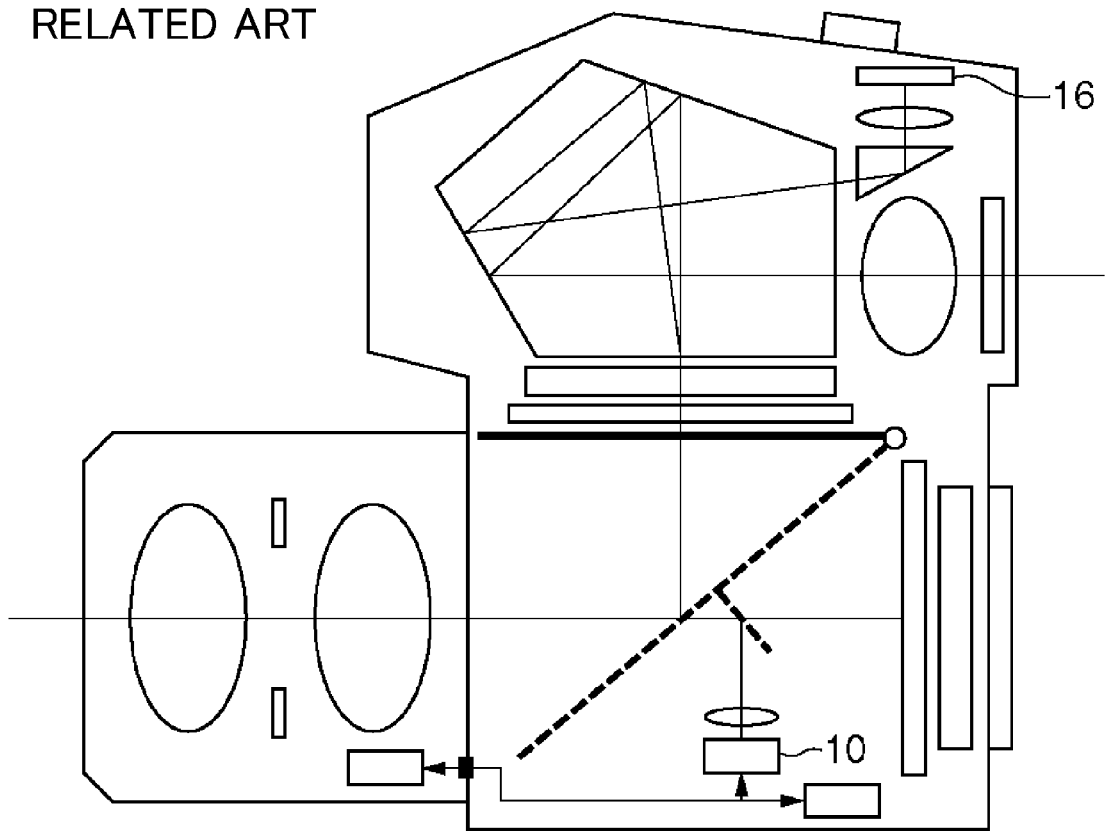
FIG. 25 is a block diagram of a conventional camera.

Next, the signal of the image BLK9 is read from the second frame memory 1109a, and the focus operation is performed based on the read signal (Steps S1105 to S1107). FIG. 24 is a pixel signal obtained from the image BLK9 in the second frame memory 1109a. The pixel signal read from the second frame memory 1109a is accumulated to be controlled so that the P-B signal in the block is equal to or greater than the stop level. In the correlation calculation in performing the focus detection, a DC component is an unnecessary signal. On the other hand, the P-B signal that is a contrast component influences the accuracy of the correlation calculation. Therefore, in the present embodiment, the focus detection signal is clamped based on the bottom reference to perform the amplification process to cut the DC component and amplify the P-B signal.

Next, the pixel signals are read out from the first frame memory 1108a in a second signal accumulation operation (Steps S1101 and S1102). The CPU 1100 generates the image of FIG. 23B based on the read pixel signals, and compares the image with a reference image stored previously to determine the existence of the object near the image BLK12. Then, the image near the image BLK12 is stored as a new reference image (Steps S1103 and S1104). Furthermore, the signal of the image BLK12 is read from the second frame memory 1109a, and the focus operation is performed based on the read signal (Steps S1105 to S1107).

Furthermore, the pixel signals are read out from the first frame memory 1108a in a third signal accumulation operation (Steps S1101 and S1102). The CPU 1100 generates the image of FIG. 23C based on the read pixel signals, and compares the image with a reference image stored previously to determine the existence of the object near the image BLK19. Then, the image near the image BLK19 is stored as a new reference image (Steps S1103 and S1104). Additionally, the signal of the image BLK19 is read from the second frame memory 1109a, and the focus operation is performed based on the read signal (Steps S1105 to S1107).

In the present embodiment, the image is generated based on the signal stored in the first frame memory 1108a, but the image may also be generated based on the signal from the first frame memory 1108b in which the amplified signal is stored if it is determined that the reference image is dark. In addition, the image may also be generated by combining the signals stored in the first frame memories 1108a and 1108b.

As described above, the AF sensor 1101 is configured so as to accumulate the focus detection pixel signal and the object recognition signal to be able to track the moving object position to perform the focusing corresponding to the detected object position. The focus detection signal is controlled so as to be accumulated for every block that is obtained by dividing the area sensors 1102a and 1102b by the block division, and further the amplification process of the P-B signal is performed using the bottom signal reference to be able to perform the focus detection with high accuracy. Additionally, the object recognition signal is controlled to be accumulated collectively in the whole of the area sensors 1102a and 1102b and is outputted using the OB pixel signal reference to continuously obtain the image having a high correlation of the luminance distribution to be able to recognize the object with high accuracy. Furthermore, the plurality of frame memories are contained to obtain both the focus detection signal and the object recognition signal by one signal accumulation operation to be able to shorten the time required for the focus detection.

The present embodiment describes the still camera, but the focus detection apparatus and the photometry apparatus of the present technology can also be applied to a cam coder (a movie camera) that performs a video shooting, various kinds of inspection cameras, a monitoring camera, an endoscope camera, a robot camera, or the like, instead of the still camera. Furthermore, the present embodiment may also be applied to an apparatus that includes an image sensor having the focus detection function. The present embodiment provides the focus detection apparatus of the camera, and more particularly is advantageous to the still camera or the movie camera.

According to the present embodiment, one AF sensor has both the object recognition function and the focus detection function to be able to provide the focus detection apparatus that has the object tracking function at low cost. Additionally, the AF sensor includes an accumulation control mode and an output mode of the object recognition signal and an accumulation control mode and an output mode of the focus detection signal to be able to improve both the object recognition accuracy and the focus detection accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-102686, filed on Apr. 27, 2010 and Japanese Patent Application No. 2010-137822, filed on Jun. 17, 2010, which are hereby incorporated by reference herein in their entirety.

What is claimed is:

1. A focus detection apparatus comprising:
an image pickup element configured to take an object image incident via a photographic optical system;
an object recognition part configured to compare an image obtained by the image pickup element with an image stored previously to detect a position of a main object based on the image obtained by the image pickup element;
a focus detection part configured to detect an in-focus state of a plurality of positions in a screen of the image pickup element;
a reliability determination part configured to determine a reliability of a detection result of the in-focus state of the plurality of positions including the position of the main object in the screen of the image pickup element;
a determination part configured to determine a position where the reliability of the detection result of the in-focus state is the highest of the plurality of positions based on a determination result of the reliability determination part; and
a selector configured to select one of the detection result of the in-focus state of the position of the main object and the detection result of the in-focus state of the position where the reliability of the detection result of the in-focus state is determined to be the highest to be used for performing a focusing of the photographic optical system.

2. The focus detection apparatus according to claim 1, wherein the reliability determination part determines the reliability of the detection result of the in-focus state based on the position of the main object detected by the object recognition part and image information near the position of the main object.

3. The focus detection apparatus according to claim 1, wherein the reliability determination part determines the reliability of the detection result of the in-focus state based on at least one of a color, a brightness, a contrast, and a shape of the main object.

4. The focus detection apparatus according to claim 1, further comprising a display configured to display both the position of the main object and the position where the reliability of the detection result of the in-focus state is determined to be the highest.

5. The focus detection apparatus according to claim 4, wherein the display is configured to display the position of the main object and the position where the reliability of the detection result of the in-focus state is determined to be the highest so as to be different in at least one of a display shape, a color, and a timing.

6. The focus detection apparatus according to claim 1, wherein the focus detection part performs focus detection of a phase detection method using a signal of a plurality of line sensors.

7. The focus detection apparatus according to claim 6, wherein the plurality of line sensors are arrayed in a plurality of different directions, and a direction of a line sensor used for detection of the in-focus state is determined based on the determination result of the reliability determination part.

* * * * *